United States Patent
Xu et al.

(10) Patent No.: US 10,808,296 B2
(45) Date of Patent: Oct. 20, 2020

(54) SELECTIVE RECOVERY OF RARE EARTH METALS FROM AN ACIDIC SLURRY OR ACIDIC SOLUTION

(71) Applicant: II-VI Delaware, Inc., Wilmington, DE (US)

(72) Inventors: Wen-Qing Xu, Medfield, MA (US); Marie Ysabel R. Abella, E.B. Magalona (PH); Gomer M. Abrenica, Manaoag (PH); Louie I. Bedes, Quezon (PH); Vincent D. Mattera, Orefield, PA (US); Shailesh Patkar, Irwin, PA (US)

(73) Assignee: II-VI Delaware, Inc., Wilmington, DE (US)

( * ) Notice: Subject to any disclaimer, the term of this patent is extended or adjusted under 35 U.S.C. 154(b) by 0 days.

(21) Appl. No.: 16/186,897

(22) Filed: Nov. 12, 2018

(65) Prior Publication Data
US 2019/0078175 A1    Mar. 14, 2019

Related U.S. Application Data

(63) Continuation-in-part of application No. 15/759,561, filed as application No. PCT/US2016/058630 on Oct. 25, 2016.

(60) Provisional application No. 62/587,858, filed on Nov. 17, 2017, provisional application No. 62/248,473, filed on Oct. 30, 2015, provisional application No. 62/269,174, filed on Dec. 18, 2015.

(51) Int. Cl.
C22B 59/00 (2006.01)
C22B 3/42 (2006.01)

(52) U.S. Cl.
CPC ............... *C22B 59/00* (2013.01); *C22B 3/42* (2013.01)

(58) Field of Classification Search
None
See application file for complete search history.

(56) References Cited

U.S. PATENT DOCUMENTS

| 2,860,031 A | 11/1958 | Grinstead |
| 3,018,243 A | 1/1962 | Nevens |
| 3,159,452 A | 12/1964 | Lerner |

(Continued)

FOREIGN PATENT DOCUMENTS

| CN | 103789547 A | 5/2014 |
| GB | 862204 | 3/1961 |

(Continued)

OTHER PUBLICATIONS

Gupta et al., "ExtractiveMetallurgy of Rare Earths", CRC Press, 2005, p. 163, Boca Raton, FL.

(Continued)

*Primary Examiner* — Melissa S Swain
(74) *Attorney, Agent, or Firm* — Blank Rome LLP

(57) ABSTRACT

A method for extracting rare earth metals from an acidic slurry or an acidic solution. The method includes providing an acidic slurry or acidic solution; adding a composite comprising an extractant and a polymer resin; mixing the composite with the acidic slurry or acidic solution to form a mixture slurry or solution; and separating the mixture slurry or solution into a rare-earth-metal-loaded composite and a raffinate slurry or solution. The acidic slurry or acidic solution comprises at least one rare earth metal and at least one early transition metal and/or at least one actinide metal.

19 Claims, 7 Drawing Sheets

(56) References Cited

U.S. PATENT DOCUMENTS

| | | |
|---|---|---|
| 3,524,723 A | 8/1970 | Millsap et al. |
| 3,582,263 A | 6/1971 | Chiola et al. |
| 3,751,553 A | 8/1973 | Gaudermack et al. |
| 3,969,476 A | 7/1976 | Lucas et al. |
| 4,041,125 A | 8/1977 | Alstad et al. |
| 4,624,703 A | 11/1986 | Vanderpool et al. |
| 4,647,438 A | 3/1987 | Sabot et al. |
| 4,718,996 A | 1/1988 | Vanderpool et al. |
| 4,751,061 A | 6/1988 | Kim et al. |
| 4,808,384 A | 2/1989 | Vanderpool et al. |
| 4,816,233 A | 3/1989 | Rourke et al. |
| 5,015,447 A | 5/1991 | Fulford et al. |
| 5,030,424 A | 7/1991 | Fulford et al. |
| 5,708,958 A | 1/1998 | Koma et al. |
| 5,787,332 A | 7/1998 | Black et al. |
| 6,110,433 A | 8/2000 | Kleinsorgen et al. |
| 6,238,566 B1 | 5/2001 | Yoshida et al. |
| 7,138,643 B2 | 11/2006 | Lewis et al. |
| 7,282,187 B1 | 10/2007 | Brown et al. |
| 7,799,294 B2 | 9/2010 | Kordosky et al. |
| 7,829,044 B2 | 11/2010 | Makioka et al. |
| 8,062,614 B2 | 11/2011 | Kordosky et al. |
| 8,177,881 B2 | 5/2012 | Sugahara et al. |
| 8,328,900 B2 | 12/2012 | Bednarski et al. |
| 9,481,638 B2 | 11/2016 | Goto et al. |
| 2004/0031356 A1 | 2/2004 | Lorenzo et al. |
| 2005/0107599 A1 | 5/2005 | Makioka et al. |
| 2006/0024224 A1 | 2/2006 | Neudorf et al. |
| 2010/0089764 A1 | 4/2010 | Torres et al. |
| 2010/0282025 A1 | 11/2010 | Nisbett |
| 2012/0100049 A1 | 4/2012 | Tavlarides et al. |
| 2012/0160061 A1 | 6/2012 | Heres et al. |
| 2013/0283977 A1 | 10/2013 | Lakshmanan et al. |
| 2017/0260606 A1 | 9/2017 | Kasaini |
| 2018/0023168 A1 | 1/2018 | Yamaguma et al. |

FOREIGN PATENT DOCUMENTS

| | | |
|---|---|---|
| KR | 1020170089934 A | 8/2017 |
| WO | 2012071629 A1 | 6/2012 |
| WO | 2013136941 A1 | 9/2013 |
| WO | 2015106324 A1 | 7/2015 |

OTHER PUBLICATIONS

Ritcey, "Development of Industrial Solvent Extraction Processes", Solvent Extraction Principles and Practice, 2004,. pp. 277-337, Second Edition, Marcel Dekker, Inc., New York, NY.

Yadav et al., "Studies on separation of rare earths from aqueous media by polyethersulfone beads containing D2EHPA as extractant", Separation and Purification Technology, 2013, pp. 350-358, vol. 118.

So et al., "New SPE column packing material: Retention assessment method and its application for the radionuclide chromatographic separation", Journal of Radioanalytical and Nuclear Chemistry, 2008, pp. 651-661, vol. 277 No. 3.

Wei et al., "Selective iron sorption for on-line reclaim of chromate electroplating solution at highly acidic condition", Chemical Engineering Journal, 2015, pp. 434-443.

SELECTIVE RECOVERY OF RARE EARTH METALS FROM AN ACIDIC SLURRY OR ACIDIC SOLUTION

CROSS REFERENCE TO RELATED APPLICATION

This application is a continuation-in part application claiming priority to U.S. Provisional Application No. 62/587,858 and U.S. application Ser. No. 15/759,561 filed on Mar. 13, 2018, which claims priority to International Patent Application No. PCT/US2016/058630 filed on Oct. 25, 2016, U.S. Provisional Application No. 62/248,473 filed on Oct. 30, 2015, and U.S. Provisional Application No. 62/269,174 filed on Dec. 18, 2015, the disclosures of which are hereby incorporated in their entirety by reference.

BACKGROUND OF THE INVENTION

Field of the Invention

The present invention is directed to a method for selective recovery of valuable metals, specifically, rare earth metals, from an acidic slurry or acidic solution.

Description of Related Art

A. Solvent Extraction Process

Solvent extraction is widely used for recovering valuable metals that are dissolved in an aqueous solution, as disclosed in U.S. Pat. Nos. 4,041,125; 4,624,703; 4,718,996; 4,751,061; 4,808,384; 5,015,447; 5,030,424; 5,708,958; 6,110,433; 6,238,566; 7,138,643; 7,282,187; 7,799,294; 7,829,044; 8,062,614; 8,177,881; 8,328,900 and United States Patent Application Publication Nos. 2004/0031356; 2005/0107599; 2006/0024224; 2010/0089764; 2010/0282025; and 2012/0160061. The valuable metals are typically acid-leached into the aqueous solution from ores and/or other feedstock and a clear aqueous solution containing valuable metals is separated from the acid-leached ore slurry by filtration and washing. The solvent extraction is then performed on the clear aqueous solution.

The feedstock may include different rare earth metal-containing ores and minerals, such as titania ore tailing, uranium ore tailing, red mud that is typically generated from an aluminum Bauxite-Bayer process, and other such materials. In addition, the ore and/or feedstock that contain these valuable metals may be pre-processed for the purpose of achieving threshold leachability and commercial viability. Such processing may include particle-size reduction, hydrothermal treatments involving hydrothermal reactions, high-temperature treatments involving solid phase reactions, meta-glassy-phase high temperature reactions, complete melting high temperature liquid phase reactions, etc.

In the solvent extraction process, an organic liquid or solvent phase containing extractant(s) that can chemically react with a valuable metal or multiple valuable metals is well mixed with the aqueous solution that contains such valuable metal ion(s). The valuable metal ion or multiple valuable metal ions are then transferred into the organic phase of the extractive organic solvent during mixing. Intensive mixing ensures a complete transfer of the valuable metal ion(s) from the aqueous phase to the organic phase. After mass transfer of valuable metal(s) from the aqueous phase to the organic phase, the process typically undergoes a phase separation via gravitational settling or a high-g centrifugal phase separation mechanism, such as a centrifuge.

Industrially, a continuous process using a combination of (1) mixing an organic extractive solvent and an aqueous solution containing valuable metal(s) and (2) settling the mixture of such aqueous and organic phases for phase separation by gravity is called a mixer and settler process. Such a mixing and settling process can also be achieved with a batch process in a batch mixing tank in a manufacturing plant or in a beaker equipped with a magnetic stirrer or a mechanical mixer in a chemical lab. The separated organic phase is the desirable product that contains the valuable metals. The separated aqueous phase is called raffinate which, ideally, contains minimum amounts of the targeted valuable metal(s). When mixing the aqueous solution and the organic extractive solvent, intensive mixing can lead to emulsions, oil-in-water or water-in-oil. In the event of forming emulsions, the phase separation process may need to be extended to a level that is not economically feasible. In some cases, the formed emulsions might be stable enough such that economical phase separation is impossible, and, in other cases, phase separation may be incomplete, which results in a loss of valuable organic solvent and valuable metals contained in the lost organic solvent.

The process of obtaining a clear aqueous solution containing water-soluble valuable metal(s) by separating it from acid-leached ore slurries via filtration and washing may also result in low yield recovery of the valuable metal(s) and/or generation of a large volume of aqueous solution that contains low concentrations of valuable metal(s). Washing with an insufficient amount of water leads to a loss of significant amounts of residual valuable metal(s) that are still physically trapped in the residues of the filter cakes. In practical processes, a complete recovery of the valuable metals from the acid-leached ore slurries could never be achieved even if unlimited amounts of water could be used for thorough washing since partial amounts of the valuable metal ions are chemically bonded to the ion-exchangeable sites of the residues. And, even though thorough washing with unlimited amounts of water could theoretically reach a level of near complete recovery of the valuable metal(s) from the acid-leached ore slurries, thorough washing with unlimited water is impractical since it requires a downstream process, solvent extraction in this case, to process a huge volume of aqueous solutions that contain low concentrations of valuable metal(s). Use of such unlimited amounts of water also leads to issues related to the costs involved with disposing of such a huge volume of waste raffinate, not to mention the usage of a huge volume of fresh water resources.

In addition, in the prior art, direct solvent extraction of valuable metal(s) from a leached slurry in mixing tanks has not been practiced industrially due to issues of crud formation and emulsion formation. Crud formation occurs when, during the contact of the organic extractive solvent and the acid-leached ore slurries, some inorganic particles are bonded to the extractant molecules chemically and undesirably transferred into the organic phase along with the desirable mass transfer of the valuable metal ion(s) from the aqueous phase to the organic phase. Crud is defined in the art as the material resulting from the agitation of an organic phase, an aqueous phase, and fine solid particles that form a stable mixture (Gordon M. Ritcey, "Development of Industrial Solvent Extraction Processes" in the book *Solvent Extraction Principles and Practices*, second edition, revised and expanded, edited by Jan Rydberg, Michael Cox, Glaude Musikas, and Gregory R. Choppin and published by Marcel Dekker, Inc., pg. 313, 2004). Emulsions are classified into two different forms, oil-in-water and water-in-oil, both of which are typically formed under intense mixing conditions due to the formation of oil droplets in water or water droplets in oil. The droplet size of such newly formed emulsions decreases with the level of mixing. Intense mixing conditions lead to emulsions with smaller droplet sizes. The smaller droplets are more difficult to coagulate to form a continuous aqueous phase and a continuous organic phase. Therefore, emulsions of small droplets are stable, which then results in difficulties in phase separation. However, intensive mixing is critical to keep ore particles contained in the leached slurry suspended. Therefore, direct solvent extraction of valuable metal(s) from leached suspended-particle-containing ore slurries needs to be performed under intense mixing conditions, resulting in the formation of substantial emulsions, either in the form of water-in-oil or oil-in-water. This creates a practical dilemma that prevents successful implementation of direct solvent extraction of valuable metal(s) from leached ore slurries in a continuous mixer and settler process or in a batch tank process.

Lucas and Ritcey, inventors of U.S. Pat. No. 3,969,476, disclose a sieve-in-plate pulse column process, called the "solvent-in-pulp" process, in which soluble valuable metal(s) is extracted from ore slurries. Lucas and Ritcey also realize that up to the time of their patent disclosure, no process had run successfully on a plant scale for the recovery of valuable metal(s) directly from leached ore slurries. They also state that early work on mixer-settlers proved unsatisfactory because the excessive agitation caused stable emulsions and crud formation with amines (the extractant used in Lucas and Ritcey's disclosure). Even now, the common wisdom is that direct solvent extraction of valuable metal(s) from leached ore slurries in a mixer-settler process or a batch tank process cannot properly operate practically due to the excessive formation of crud and emulsions which form excessively in a continuous mixer-settler process and a batch-type mixing tank because the intensity of the mixing has to be strong enough to keep the acid-leached ore slurries suspended.

Even though Lucas and Ritcey's disclosure claims preliminary success in direct solvent extraction of valuable metal(s) from the leached ore slurries by using a sieve-in-plate pulse column process, the sieve-in-plate pulse column process still suffers critical limitations. One of the limitations is that any leached ore slurry has a very broad particle size distribution. Large particles may not be well-suspended and may plug the sieve holes of the column plates. Small particles might flocculate to form large particle agglomerates due to a lack of shear in the column and these large agglomerated particles might also plug the sieve holes of the column plates. Excessive sieve hole plugging by large particles normally accelerates with the time on stream to a point where the column has to be completely dissembled for cleaning, which is costly and tedious. The aforementioned limitations likely have led to no actual industrial adaptation of direct solvent extraction of valuable metal(s) from leached ore slurries using the sieve-in-plate pulse column process disclosed by Lucas and Ritcey more than three decades ago. Thus, current industrial standard practices still use organic solvents containing extractant(s) to extract valuable metals from clear aqueous solutions that are produced by filtering and washing the leached ore slurries.

After the issuance of U.S. Pat. No. 3,969,476, one of its inventors, Gordon M. Ritcey, published his article "Development of Industrial Solvent Extraction Processes" in the book "Solvent Extraction Principles and Practices", second edition, revised and expanded, edited by Jan Rydberg, Michael Cox, Glaude Musikas, and Gregory R. Choppin and published by Marcel Dekker, Inc., in 2004, and states on page 313 that "[s]olids must be absent from most solvent extraction circuits and clarification is usually aimed at achieving about 10 ppm of solids", which is 0.001% solids contents of the aqueous solution. In direct solvent extraction on the other hand, solids content of acid-leached ore slurries may be three to five magnitudes higher, from a few percent to as high as 50-70%.

Another limitation of Lucas and Ritcey's method is that the extractant molecules in the organic extractive solvent are of the amine type. Organic extractive solvents of the amine type are typically cationic and react with and bond to the anionic surface sites of silicate/silica-related residues in the ore slurry. Such bonding of the amine type extractive molecules in the organic extractive solvent to the anionic surface sites of the silica/silicate-related residues leads to a significant loss of the organic extractive solvent. Therefore, Lucas and Ritcey's process requires a pretreatment with organic non-ionic hydrophilic materials which are adsorbed by the gangue solids for the purposes of decreasing the affinity of the gangue solids for the amine; however, solvent loss still exists, which is a substantial cost for recovering valuable metal or metals from acid-leaching slurry that contains a very low concentration of valuable metal or metals.

In summary, solvent extraction process experiences more or less the problems of (1) solvent loss, (2) difficulties in achieving a complete organic-aqueous phase separation, (3) formation of emulsions, (4) crud formation, and (5) poor economics in dealing with a large volume of acid-leaching solution and/or acid-leaching slurry that contains a very low concentration of valuable metal or metals, etc.

B. Ion-Exchange Resin Process

As described in the book "Extractive Metallurgy of Rare Earths", by C. K. Gupta, N. Krishnamurthy, CRC Press, 2000, at page 163, an ion-exchange resin is typically considered as an ionic salt in which exchangeable ions are attached to an insoluble organic matrix. Such exchangeable ions in ion-exchange resins may be cations or anions, and the resins are referred to as a cation exchange resin or an anion exchange resin, respectively. Cation exchange resins may be used to uptake valuable metal ion(s) from acid-leaching solutions and/or acid-leaching slurries.

Typical ion exchange resins are categorized into strong resins, weak resins, and resins that lie between strong resins and weak resins. Dow Chemical produces strong cation ion-exchange resins that have sulfonic acid functional groups, such as Dowex™G-26(H), and chelating cation ion-exchange resins that have iminodiacetic acid groups, such as Amberlite™ 7481. Purolite® produces a cation ion-exchange resin, Purolite® S957, that has a phosphoric acid functional group. Alkali ion forms, such as sodium forms, or proton forms of these resins may be used to uptake valuable metal or metals.

When an ion-exchange resin comes into contact with an aqueous solution/slurry that contains different electrolyte cations, the exchangeable ions of the ion exchange resin may be displaced; generally, (1) an ion of higher charge displaces an ion of lower charge, (2) between similarly charged ions, the ions of a large radius displaces the one of the smaller radius, and (3) the displacement occurs according to the law of mass action.

The majority of rare earth metal ions have chemical valences of 3+ in acid-leaching solutions and/or slurries;

however, such acid-leaching solutions and/or slurries contain very low concentrations of rare earth metal ions or valuable metal ions, while the majority of the soluble cations are $Fe^{3+}$, $Ti^{4+}$, $Zr^{4+}$, etc., plus alkali and alkali earth cations such as $Na^+$, $Ca^{2+}$, $Mg^{2+}$, etc. Selective uptake of rare earth metal ion(s), or valuable metal ion(s), over other cations, which are the majority of the cations in the acid-leaching solutions and/or slurries, is very challenging since cations like $Fe^{3+}$, $Ti^{4+}$, $Zr^{4+}$ have chemical valences higher than or similar to the rare earth metal ion(s) or valuable metal ion(s).

Strong cation ion-exchange resins were declared ineffective for selective uptake of useful rare earth metal ion(s) in U.S. Pat. No. 4,816,233 since the strong cation ion-exchange resin is quickly saturated by other cations ($Fe^{3+}$ and $Mn^{4+}$) in the acid-leaching solution and/or slurry from tungsten ore residues (containing about 632 ppm scandium in Example 1). U.S. Pat. No. 4,816,233 discloses a process of reducing $Mn^{4+}$ and $Fe^{3+}$ ions into $Mn^{2+}$ and $Fe^{2+}$, respectively, by hydrazine hydrate, followed by adjusting the pH to about 2.0 and contacting the solution with Amberlite™ IRC-718, a chelating cation ion-exchange resin with iminodiacetic acid functional groups. However, such an acid-leaching solution has a ratio of iron to scandium of 173:1 and a ratio of manganese to scandium of 278:1, therefore, a large amount of hydrazine hydrate per unit of scandium (289 L/kg scandium) is used in the process. Hydrazine hydrate is a very expensive chemical, so the step of hydrazine hydrate reduction alone is costly, not to mention the other chemicals that are used in the leaching process and purification steps. Furthermore, feedstock, such as Ni/Co-containing ores (such as laterite) and red muds from aluminum bauxite process, only contain scandium at a level of less than 100 ppm, in most cases, or less than 200 ppm, in some cases, which makes this process cost-prohibitive due to the requirement for a large amount of hydrazine hydrate for reduction of ferric ions to ferrous ions.

Therefore, the present invention addresses the practical need for a new material/composition that allows a new process to extract valuable metals, such as rare earth metals, more particularly, scandium, from an acid-leaching slurry/solution that contains a very low concentration of valuable metal ions (rare earth metals, more particularly, scandium) and a very high concentration of ferric/titanium ions or other trivalent/tetravalent cations. Particularly, the embodiments of the present invention enable the economic recovery of valuable metals (rare earth metals, particularly, scandium) from feedstock that contains very low concentrations of said valuable metals without suffering the shortcomings of solvent extraction including solvent loss, difficulties in achieving a complete solvent-aqueous phase separation, formation of emulsions, crud formation, etc.

SUMMARY OF THE INVENTION

The invention is directed to a method for extracting rare earth metals from an acidic slurry or acidic solution. The method comprises providing an acidic slurry or acidic solution, adding a composite comprising an extractant and a polymer resin, mixing the composite with the acidic slurry or acidic solution to form a mixture slurry or solution, and separating the mixture slurry or solution into a rare-earth-metal-loaded composite and a raffinate slurry or solution. The acidic slurry or acidic solution comprises at least one rare earth metal (scandium (Sc), yttrium (Y), lanthanum (La), cerium (Ce), praseodymium (Pr), neodymium (Nd), promethium (Pm), Samarium (Sm), europium (Eu), gadolinium (Gd), terbium (Tb), dysprosium (Dy), holmium (Ho), erbium (Er), thulium (Tm), ytterbium (Yb), and lutetium (Lu)) and at least one early transition metal (titanium (Ti), zirconium (Zr), hafnium (Hf), vanadium (V), niobium (Nb), tantalum (Ta), chromium (Cr), molybdenum (Mo), tungsten (W), manganese (Mn) and rhenium (Re)) and/or at least one actinide metal (actinium (Ac), thorium (Th), protactinium (Pa), uranium (U), neptunium (Np), plutonium (Pu), americium (Am), curium (Cm), berkelium (Bk), californium (Cf), einsteinium (Es), fermium (Fm), mendelevium (Md), nobelium (No) and lawrencium (Lr)).

Each of the early transition metal(s) may be present in the acidic slurry or acidic solution in an amount up to 50,000 ppm and/or each of the actinide metal(s) may be in the acidic slurry or acidic solution in an amount up to 5,000 ppm. The acidic slurry or acidic solution may be an acidic slurry or acidic solution generated during processing of an ore containing at least one rare earth metal and at least one early transition metal and/or at least one actinide metal, and may be a titanium tailing waste liquor from processing of titanium ores such as the chloride process employed in the production of titanium tetrachloride or titanium dioxide from rutile and the sulfate process employed in the production of titanium dioxide from ilmenite. The rare earth metal may be scandium.

The method may further comprise raising the pH of the acidic slurry or acidic solution to form a precipitate of at least a portion of at least one early transition metal and/or at least one actinide metal, for example titanium, thorium, or both. The precipitate may be filtered from the acidic slurry or acidic solution prior to adding the composite.

The method may further comprise stripping the rare earth metals from the rare-earth-metal-loaded composite and regenerating the composite for reuse. The composite may be regenerated using a solution generated during the processing of ores containing at least one rare earth metal and at least one early transition metal and/or at least one actinide metal. The regeneration solution may be an acid scrubber solution or a spent processing waste solution, and may be an acid scrubber solution from processing of titanium ores such as the chloride process employed in the production of titanium tetrachloride or titanium dioxide from rutile and the sulfate process employed in the production of titanium dioxide from ilmenite.

The polymer resin may have at least one phosphoric acid functional group and/or the extractant may comprise a cation extractant. The extractant may be di(2ethylhexyl)phosphoric acid (DEHPA).

DESCRIPTION OF THE INVENTION

Figure 1:
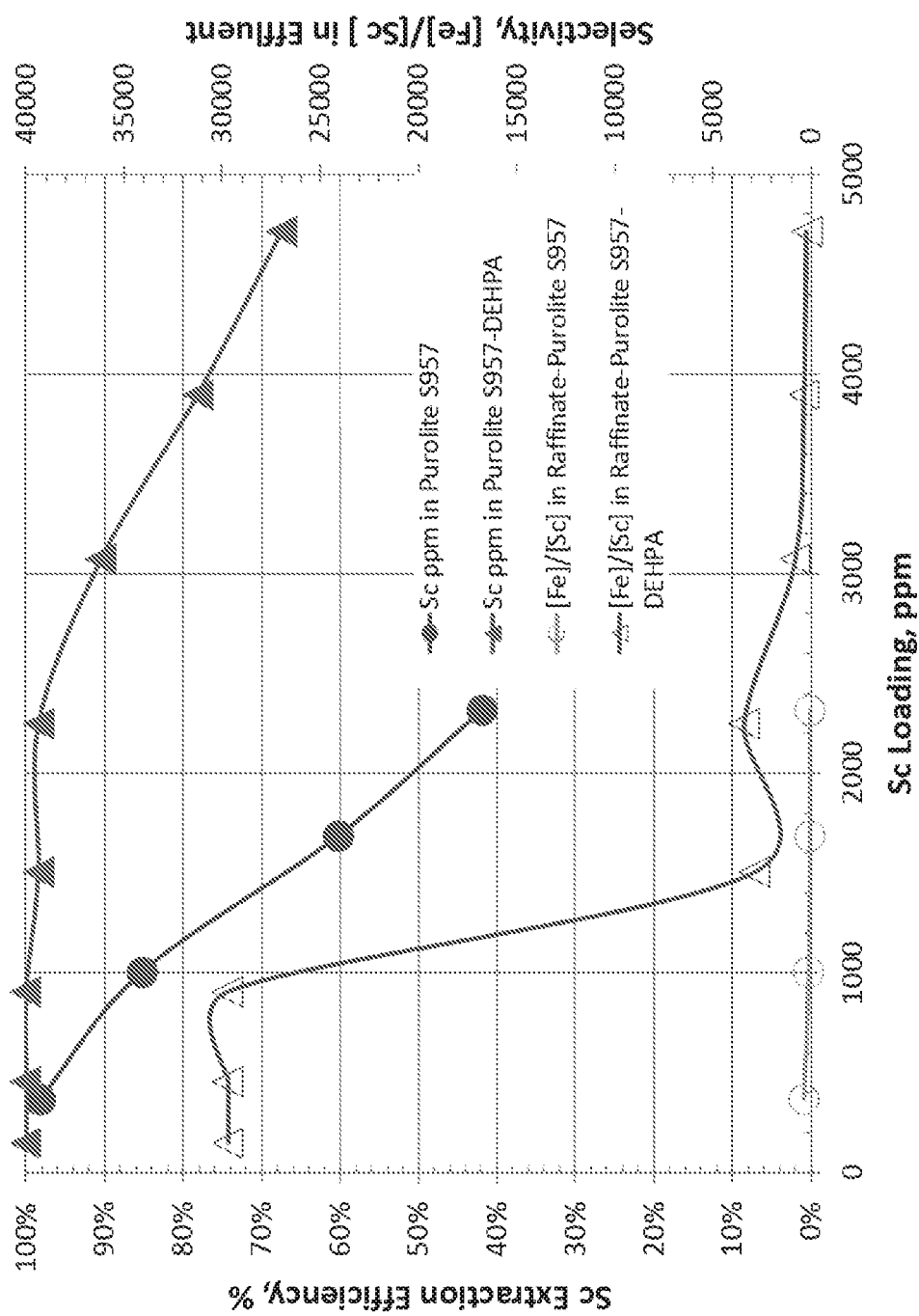
FIG. 1 is a graph comparing scandium recovery when using a polymer resin having phosphoric acid functional groups and when using a composite extractant-enhanced polymer resin according to the present invention in a column process for extracting rare earth metals from an acid-leaching solution that contains a large amount of ferric ions (Example 31)

As used herein, unless otherwise expressly specified, all numbers such as those expressing values, ranges, amounts or percentages may be read as if prefaced by the word "about", even if the term does not expressly appear. Any numerical range recited herein is intended to include all sub-ranges subsumed therein. For example, a range of "1 to 10" is intended to include any and all sub-ranges between and including the recited minimum value of 1 and the recited maximum value of 10, that is, all subranges beginning with a minimum value equal to or greater than 1 and ending with a maximum value equal to or less than 10, and all subranges in between, e.g., 1 to 6.3, or 5.5 to 10, or 2.7 to 6.1. Plural encompasses singular and vice versa. When ranges are given, any endpoints of those ranges and/or numbers within those ranges can be combined with the scope of the present invention. "Including", "such as", "for example" and like terms means "including/such as/for example but not limited to".

Preparation of a Composite Extractant-Enhanced Polymer Resin

The present invention is directed to a composite comprising an extractant and a polymer resin.

Any suitable extractant may be used to prepare the composite extractant-enhanced polymer resin. The extractant may be anionic, cationic, or non-ionic. Such extractants include, but are not limited to, a cation exchange extractant such as organophosphorous acids, sulfonic acids, and carboxylic acids, a neutral extractant such as tri-n-butyl-phosphate, and an anion exchange extractant such as the amines. A primary industrial extractant comprises di-(2-ethylhexyl)-phosphoric acid (DEHPA), 2-ethyl-hexyl-2-ethyl-hexyl-phosphoric acid (EHEHPA), tributyl-phosphate (TBP), versatic acid, versatic 10, Alamine® 336, and Aliquat 336. For example, phosphorus-containing molecules may be used as the extractant to enhance the ability of the polymer resin to extract valuable metals such as rare earth metals or di-(2-ethylhexyl)-phosphoric acid (DEHPA) may be used as the extractant for preparing a composite DEHPA-enhanced polymer resin.

The extractant may be used in its original form for preparation of a composite extractant-enhanced polymer resin, or may optionally be diluted by a solvent or modified by a modifier prior to use. Suitable optional solvents used for dilution include, but are not limited to, water, alcohol, ester, ether, ketone, hydrocarbon, and combinations thereof. Suitable optional modifiers include, but are not limited to, isodecanol, coconut alcohol, octanol, ethylhexyl alcohol, alcohol(s) containing six or more carbons, and combinations thereof.

Any suitable polymer resin may be used for the preparation of the composite extractant-enhanced polymer resin. The polymer resin may be synthetic or natural. The polymer resin may be non-functional and porous. For example, non-functional and porous polymers include, but are not limited to, Dow's Amberlite™ XAD7HP, Amberlite™ XAD1180N, Amberlite™ XAD2, Amberlite™ XAD4, and Amberlite™ XAD 16N. The polymer resin may also be functional. The functional group may include, but is not limited to, sulfonic acid, iminodiacetic acid, carboxylic acid, phosphoric acid, and amine. Functional polymer resins that have sulfonic acid functional group(s) include, but are not limited to, Dow's Amberlite™ IRC-120 and Dowex™ G-26 (H). Functional polymer resins that have carboxylic acid functional groups include, but are not limited to, Amberlite™ FPC-3500 and Amberlite™ IRC-86SB. Functional polymer resins that have phosphoric acid functional groups include, but are not limited to, Purolite® S957, Monophosphonix, and Diphosphonix. Functional polymer resins that have amine functional groups include, but are not limited to, Amberlite® IRA96 and Dowex® Marathon.

The composite extractant-enhanced polymer resin may contain 80 wt. % or less of the extractant, for example, 60 wt. % or less of the extractant, or 50 wt. % or less of the extractant.

The composite extractant-enhanced polymer resin may be prepared by soaking the polymer resin in a pure extractant liquid or in a mixture solution comprising extractant and organic solvent, followed by filtration and washing. The solvent may be a low carbon alcohol such as ethanol and isopropanol or may be ketone, ether, and/or another organic solvent.

The wet extractant-enhanced polymer resin may have a density of at least 0.3 g/ml and up to 1.30 g/ml, for example, 0.3-1.3 g/ml, 0.4-1.1 g/ml, or 00.5-1.1 g/ml.

Extraction of Rare Earth Metals from Acid-Leaching Slurries or Acid-Leaching Solutions The prepared composite extractant-enhanced polymer resin, in a wet form, may be used directly for extracting the valuable metals from an acid-leaching slurry or an acid-leaching solution, or may be dried in air or in an oven at a temperature that is not detrimental to the resin and extractant and then used for extraction. For example, the drying temperature may be ≤200° C., ≤150° C., ≤120° C., ≤100° C., ≤80° C., or room temperature.

Direct extraction of rare earth metals, including scandium (Sc), yttrium (Y), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu) using the composite extractant-enhanced polymer resin may be carried out in a batch operation or continuously.

An aqueous acid-leaching slurry or solution containing one or more rare earth metals is combined in a mixing tank with the composite extractant-enhanced polymer resin prepared as described above. An aqueous acid-leaching solution is the liquid resulting from filtration of an acid-leaching slurry or from the separation of the liquid and solid components of an acid leaching slurry using any liquid-solid separation method.

The feedstock for the slurry is any ore, mineral, or residues that contain rare earth metals in trace amounts up to 50,000 ppm, for example up to 10,000 ppm, up to 1,000 ppm, up to 500 ppm, or up to 500 ppm. Feedstock materials include, but are not limited to, rare earth-metal-containing minerals such as thorteveitite, bastrasite, monazite, xenotime, Allanite, apatite, brannerite, eudialyte, euxenite, Fergusonite, Florencite, gadolinite, laparite, perovskite, pyrochlore, zircon, Wolframite, bazzite, Kolbeckite, jervisite, cascandite, juonnite, pretulite, scandiobingtonite, Kristiansenite, red mud, titanium tailing, tungsten tailing, uranium tailing, and cobalt and nickel minerals, such as laterites. The feedstock may be ground into a fine particulate and mixed with water and at least one suitable acid for dissolving metals in the ore. Suitable acids may include, but are not limited to, mineral acids including sulfuric acid, hydrochloric acid, and nitric acid. The leaching may be carried out at a temperature equal to or less than the boiling point of water, for example, 100° C. or below or 80-100° C., or under hydrothermal conditions at a temperature of up to 300° C., while the solution is thoroughly mixed, for example, at 145-150 rpm, or under static conditions.

The aqueous acid-leaching slurry may have a viscosity of 400 centipoise or less, for example, a viscosity of 100 centipoise or less or a viscosity of 20 centipoise or less.

The pH of the aqueous acid-leaching slurry and/or acid-leaching solution is not limited, but should be sufficient to prevent partial or complete precipitation of the rare earth metals. The pH of the aqueous acid-leached ore slurry or solution, therefore, may be up to 6.5, for example, up to 4.0.

The aqueous acid-leaching slurry and/or solution may comprise iron in the form of ferric ions and/or ferrous ions. Feedstock such as red mud, titanium tailing, uranium tailing, cobalt and nickel minerals such as laterites, and other such rare earth metal-containing ores or minerals may contain a certain level of iron, and sometimes, iron may even be a major component of the feedstock, such as red mud from an aluminum Bauxite-Bayer process. During the acid-leaching process, iron is dissolved by the acid to form ferric ions, which compete with the rare earth metal ions for the extractant molecules in the composite extractant-enhanced polymer resin. Ferric ions may be chemically reduced to ferrous ions prior to adding the composite extractant-enhanced polymer resin.

The amount of composite extractant-enhanced polymer resin used may be dictated by the targeted recovery of the targeted valuable metal ion(s). The ratio of the volume of the acid-leaching slurry or solution to the volume of composite extractant-enhanced polymer resin may vary accordingly to the properties of the slurry or solution, particularly, the concentrations of ferric ions, titanium ions, and the targeted valuable metal ions. The ratio of the volume of the acid-leaching slurry or solution to the volume of composite extractant-enhanced polymer resin may be at least 0.5 and up to 3000, for example, at least 1 and up to 2000.

The combination of the composite extractant-enhanced polymer resin and the acid-leaching slurry or solution is then mixed for at least a few minutes, for example, one hour or longer. Mixing may be accomplished using any suitable method including, but not limited to, a mixing bar, a paddle stirrer, a pump, and air-bubbling.

For aqueous acid-leaching slurries and/or solutions, the direct extraction of the rare earth metals may be carried out at room temperature or at an elevated temperature up to the boiling point of water, for example, 100° C. When elevated temperatures are used the extraction rate is accelerated.

After mixing, the composite extractant-enhanced polymer resin may be loaded with at least 2,000 wt. ppm, for example, at least 1,800 wt. ppm, at least 1,600 wt. ppm, at least 1,400 wt. ppm, at least 1,200 wt. ppm, at least 1,000 wt. ppm, at least 800 wt. ppm, at least 600 wt. ppm, at least 400 wt. ppm, or at least 200 wt. ppm of rare earth metal, such as scandium. In other terms, after mixing, the composite extractant-enhanced polymer resin may be loaded with at least 0.2 grams of rare earth metal, for example, scandium, per liter of wet composite extractant-enhanced polymer resin, for example, at least 0.4 grams of rare earth metal per liter of wet composite extractant-enhanced polymer resin, at least 0.8 grams of rare earth metal per liter of wet composite extractant-enhanced polymer resin, at least 1.2 grams of rare earth metal per liter of wet composite extractant-enhanced polymer resin, or at least 1.4 grams of rare earth metal per liter of wet composite extractant-enhanced polymer resin.

Separation of the valuable-metal-loaded composite extractant-enhanced polymer resin from the raffinate slurry and/or solution may be accomplished by gravitational settling, screening, filtering, or other appropriate processes.

The valuable-metals from the loaded extractant-enhanced polymer resin may be stripped from the composite extractant-enhanced polymer using a stripping solution comprising an acid, a base, a salt, or a chelating agent to form a solution or slurry that contains valuable metals such as rare earth metals. The acid may comprise a typical mineral acid and/or an organic acid, or a mixture of mineral acids and/or organic acids, for example, the acid may be, but is not limited to, hydrochloric acid, nitric acid, sulfuric acid, hydrofluoric acid, phosphoric acid, citric acid, oxalic acid, acetic acid, formic acid, and the like. The base may comprise a typical alkali metal base (such as, but not limited to, sodium hydroxide, potassium hydroxide, lithium hydroxide, and the like), an alkali earth metal base (such as, but not limited to, magnesium hydroxide, calcium hydroxide, barium hydroxide, and the like), an ammonium hydroxide, an organic amine which may be a primary amine, a secondary amine, a tertiary amine, and/or mixtures thereof. The salt may comprise any type of salt, for example, a salt that allows the dissolution of the rare earth metal in an aqueous solution, such as, a carbonate salt, for example, sodium carbonate, sodium bicarbonate, potassium carbonate, potassium bicarbonate, lithium carbonate, lithium bicarbonate, ammonium carbonate, and ammonium bicarbonate. The salt, the base, and/or the acid, may be used together, separately, or as a mixture. For example, a carbonate or bicarbonate salt may be used with a hydroxide base, such as, a mixture of sodium carbonate and sodium hydroxide, sodium carbonate and potassium carbonate, potassium carbonate and sodium carbonate, potassium carbonate and potassium hydroxide, and ammonium carbonate and ammonium hydroxide.

The acid, the base, and/or the salt, may be included in the stripping solution at a concentration of at least one gram per liter and up to the saturated solubility of the acid, base, or salt in the stripping solution, for example, up to 350 grams per liter. For example, the concentration of sodium carbonate may be at least 1 gram per liter and up to the solubility of sodium carbonate. The solubility of sodium carbonate increases with temperature and is about 164 grams per liter at 15° C. and 340 gram per liter at 27° C.

The stripping process may be performed at any suitable temperature as long as the rare earth metal can be removed from the resin. For the sake of economics and the safety and speed of the stripping process, the process may be carried out at room temperature or at an elevated temperature up to the boiling point of the stripping solution, for example, 100° C. Stropping may also be carried out at a temperature below room temperature, but the process will be slower and less economical.

The stripping process may be carried out in a batch process or in a continuous process, ex-situ or in-situ.

For achieving near-complete stripping of the rare earth metal from the loaded resin, the stripping process may be repeated as many times as is needed to achieve the desired objective. However, the stripping of rare earth metal from the loaded resin can be partial and does not have to be complete.

The valuable metals and other impurities in the stripping solution may be precipitated with an acid such as, but not limited to, hydrochloric acid, sulfuric acid, nitric acid, phosphoric acid, or an organic acid, such as oxalic acid or tartaric acid, followed by filtration, centrifugation, or decantation to produce a filtered cake. The filtered cake may be further purified to a scandium chemical or metal that has a purity greater than 30%, for example, greater than 50%, greater than 70%, greater than 90%, greater than 95%, greater than 99%, greater than 99.9%, greater than 99.99%, or greater than 99.999%. The chemical may be hydroxide, oxide, oxalate, carbonate, fluoride, phosphate, chloride, or other valuable chemicals. Scandium metal may be used to produce an alloy with aluminum, copper, or other metal(s). Scandium-contained materials may be used in ceramics for fuel-cells, optics, catalysts, pharmaceuticals, automobiles, aerospace, etc.

The composite extractant-enhanced polymer resin after stripping may be used directly or may be regenerated with a solution comprising an acid or a mixture of acids, for example, hydrochloric acid, sulfuric acid, nitric acid, phosphoric acid, and/or an organic acid, such as citric acid, oxalic acid, and tartaric acid, and recycled for use in the next batch or cycle. The regeneration solution may have an acid concentration of at least 1 gram per liter and up to 500 grams per liter, or may be a pure concentrated acid (such as concentrated hydrochloric acid, typically 36-37 wt. %, concentrated nitric acid, 68-70 wt. %, or concentrated sulfuric acid, up to 98 wt. %).

The regeneration process may be carried out in-situ or ex-situ. The regeneration process may be a batch process or a continuous process. The regeneration process may be performed more than once. In a multiple pass regeneration process, different type of acids may be used. Sometimes, the regeneration solution may comprise an additive, such as, but not limited to, a surfactant, a reducing agent, a chelating agent, or an oxidizing agent.

Alternatively, a continuous process may be used. The composite extractant-enhanced polymer resin may be placed in a column to form a resin bed. Acid-leaching slurry or solution may be continuously pumped through the resin bed at a flow rate ranging from at least one tenth of a bed volume per hour up to 30 bed volumes per hour, for example, from one bed volume per hour to 100 bed volumes per hour. The raffinate solution exiting the resin bed may be monitored to determine when the composite extractant-enhanced polymer resin begins to lose its efficiency for extracting the valuable metals. The valuable-metals from the loaded extractant-enhanced polymer resin may be removed as described above.

The above described method may also be used to extract the valuable metals from an acidic slurry or an acidic solution. The acidic slurry or acidic solution may be aqueous and may be any acidic slurry or acidic solution that comprises at least one rare earth metal (scandium (Sc), yttrium (Y), lanthanum (La), cerium (Ce), praseodymium (Pr), neodymium (Nd), promethium (Pm), Samarium (Sm), europium (Eu), gadolinium (Gd), terbium (Tb), dysprosium (Dy), holmium (Ho), erbium (Er), thulium (Tm), ytterbium (Yb), and lutetium (Lu)), and at least one early transition metal (titanium (Ti), zirconium (Zr), hafnium (Hf), vanadium (V), niobium (Nb), tantalum (Ta), chromium (Cr), molybdenum (Mo), tungsten (W), manganese (Mn) and rhenium (Re)), and/or at least one actinide metal (actinium (Ac), thorium (Th), protactinium (Pa), uranium (U), neptunium (Np), plutonium (Pu), americium (Am), curium (Cm), berkelium (Bk), californium (Cf), einsteinium (Es), fermium (Fm), mendelevium (Md), nobelium (No) and lawrencium (Lr)). For example, the acidic slurry or acidic solution may comprise at least one rare earth metal and at least one early transition metal or may comprise at least one rare earth metal and at least one actinide metal or may comprise at least one rare earth metal, at least one early transition metal, and at least one actinide metal.

The acidic slurry or acidic solution may be an acidic slurry or an acidic solution created during processing of materials containing at least one rare earth metal and at least one early transition metal and/or at least one actinide metal. Such materials include thortevetite, bastnasite, monazite, xenotime, Allanite, apatite, brannerite, eudialyte, euxenite, Fergusonite, Florencite, gadolinite, laparite, perovskite, pyrochlore, zircon, Wolframite, bazzite, Kolbeckite, jervisite, cascandite, juonnite, pretulite, scandiobingtonite, Kristiansenite, red mud, titanium ores such as ilminite and rutile, titanium tailings, tungsten ores, tungsten tailings, uranium ores, uranium tailings, thorium ores, thorium tailings, and laterites. The acidic slurry or acidic solution may also be a waste stream created during such processing. By treating, as described herein, a waste stream or other acidic slurry or acidic solution created during such processing, valuable rare earth metals, early transition metals, and/or actinide metals may be recovered that would otherwise be lost. Specifically, the acidic slurry or acidic solution may be titanium tailing waste liquor from processing of titanium ores such as the chloride process employed in the production of titanium tetrachloride or titanium dioxide from rutile and the sulfate process employed in the production of titanium dioxide from ilmenite. The valuable metal may be scandium.

The acidic slurry or acidic solution may comprise rare earth metals in trace amounts up to 50,000 ppm, for example, up to 10,000 ppm, up to 1,000 ppm, up to 500 ppm, or up to 50 ppm.

The aqueous acidic slurry or acidic solution may also comprise early transition metals, such as titanium, zirconium, vanadium, and niobium, in amounts up to 50,000 ppm, for example up to 10,000 ppm, up to 1,000 ppm, or up to 500 ppm, and actinide metals, such as thorium, up to 5,000 ppm, for example up to 1,000 ppm, up to 500 ppm, up to 100 ppm.

The aqueous acidic slurry or acidic solution may also comprise iron in the form of ferric ions and/or ferrous ions, which may even be a major component. Since the ferric ions may compete with the rare earth metal ions for the extractant molecules in the composite extractant-enhanced polymer resin, the ferric ions may be chemically reduced to ferrous ions prior to contacting the acidic slurry or acidic solution with the composite extractant-enhanced polymer resin.

The acidic slurry or acidic solution may comprise one or more acids, for example, hydrochloric acid, sulfuric acid, nitric acid, or mixtures thereof, and may have a free acid concentration of 400 gpL or less, for example, a free acid of 200 gpL or less, or a free acid of 100 gpL or less.

Because early transition metal ions and actinide metal ions compete with rare earth metal ions for the extractant molecules in the composite extractant-enhanced polymer resin, the acidic slurry or acidic solution may be treated to remove all or a portion of these ions prior to contacting the composite extractant-enhanced resin. The early transition metal ions and/or actinide metal ions may be preferentially chemically precipitated by adjusting the pH of the acidic slurry or acidic solution with a base to form a pH-adjusted slurry or solution. Such bases include, but are not limited to, sodium hydroxide, calcium hydroxide, hydrated lime, calcium carbonate, magnesium hydroxide, or a combination thereof. The pH of the resulting pH-adjusted slurry or solution may be at a pH value of at least 0 and up to 6, for example at least 0.2 and up to 4, at least 0.3 and up to 2, or at least 0.4 and up to 1. The pH adjustment may be carried out at a temperature equal to or less than the boiling point of water, for example, 100° C. or less, 80° C. or less, 60° C. or less, or 40° C. or less. The pH-adjusted slurry that is formed will comprise a precipitate and a pH-adjusted solution which may be separated into a wet precipitate and a pH-adjusted solution by suitable separation techniques including, but not limited to, filtering, decantation, and centrifugation.

The resulting pH-adjusted solution may contain early transition metal ions, such as titanium, zirconium, vanadium, and niobium each in amounts up to 10,000 ppm, for example, up to 5,000 ppm, up to 1,000 ppm, or up to 100 ppm, and actinide metal ions such as thorium in amounts up to 1,000 ppm, for example, up to 500 ppm, up to 100 ppm, or up to 10 ppm.

As shown in Examples 35 and 36, the maximum scandium loading on the composite extractant-enhanced polymer resin achieved when processing one such acidic solution was above 200 mg/L composite. However, the breakthrough point was achieved early in the process. Delaying the breakthrough point until later in the process would provide enhanced operability and process economics. It was found that the additional step of removing a major portion of any interfering metal ions, such as titanium, niobium, and zirconium, prior to contacting the acidic slurry or solution with the composite extractant-enhanced polymer resin resulted in the breakthrough point being delayed until later in the process and higher scandium loading in the composite extractant-enhanced polymer resin (Example 37).

In addition, while the regeneration solution used to regenerate the composite after stripping may be a fresh preparation of a mineral acid such as hydrochloric acid, sulfuric acid, and/or nitric acid, the regeneration solution may also be a solution created during the processing of materials such as thortevetite, bastnasite, monazite, xenotime, Allanite, apatite, branerite, eudialyte, euxenite, Fergusonite, Florencite, gadolinite, laparite, perovskite, pyrochlore, zircon, Wolframite, bazzite, Kolbeckite, jervisite, cascandite, juonnite, pretulite, scandiobingtonite, Kristiansenite, red mud, titanium ores such as ilminite and rutile, titanium tailings, tungsten ores, tungsten tailings, uranium ores, uranium tailings, thorium ores, thorium tailings, and laterites, including waste streams created during such processing. By using a waste stream or another solution created during such processing, the need for making a fresh regeneration solution may be avoided and a waste stream or other solution that would otherwise have no use can be recycled. Specifically, the regeneration solution may be an acid scrubber solution and may be an acid scrubber solution from the processing of titanium ores such as the chloride process employed in the production of titanium tetrachloride or titanium dioxide from rutile and the sulfate process employed in the production of titanium dioxide from ilmenite.

The regeneration solution may also be a previously used regeneration solution.

The following examples are illustrative of the process:

Comparative Example 1

Acid-leached ore slurries containing valuable metals, in this case, scandium and other rare earth metals, which may be completely water-soluble or may be chemically bonded to ion-exchangeable sites of inorganic residues in the feedstock, are typically produced in 7000-liter fiber glass-reinforced plastic (FRP) reactors, according to the general disclosures in the previously referenced patents. The feedstock, the water, and the acid, in this case, sulfuric acid or hydrochloric acid, are mixed at 144 rpm with 12" triple blades that pump the slurry downwards at a temperature of 80-100° C. Such leaching slurries have a pH between 0.0 and 0.5. In this example, the composition of the acid-leaching slurry was analyzed (inductively coupled plasma-optical emission spectroscopy (ICP-OES) method) by (1) concentrated hydrochloric acid digestion, (2) volumetric dilution, and (3) filtration for residue removal, and the obtained elemental results are tabulated in Table 1. It should be noted that the analytical results for sodium, potassium, aluminum, silicon, and indium are not precise; however, it is believed that the sample does contain these elements. Also, it should be noted that the acid-leaching slurry in this example contains a substantial amount of trivalent and tetravalent cations, particularly $Fe^{3+}$ and $Ti^{4+}$, as compared to the valuable metals, such as the rare earth metals, and more specifically, $Sc^{3+}$. The molar ratio of $([Fe^{3+}]+[Ti^{4+}])$ to $[Sc^{3+}]$ in the slurry of this example is more than 75.3:1.

In the prior art extraction process, the aqueous acid-leached slurry undergoes a normal solid-liquid separation process and filtration to produce a liquid filtrate which contains the rare earth metals and solid filter cakes of the leaching residues, which are generally waste material. The filter cakes of the leaching residues are typically washed by fresh water in a volume that is equivalent to one volume of the filter press volume. The filtrate stream and washing stream are then combined into a product stream. Additional washing with fresh water in a volume that is equivalent to four volumes of the filter press leads to the formation of very large amounts of the washing filtrate that has such low concentrations of rare earth metals that it is not economically viable. Even with a thorough washing with fresh water in a volume that is equivalent to five times the volume of the filter press, there are still substantial amounts of rare earth metals left in the residue, as free metal ions are trapped inside the filter cakes or bonded to the ion-exchangeable sites of the leaching residues. Therefore, the conventional process of acid-leaching followed by filtration and washing may recover 60% to 80%, or less, of the rare earth metals. In addition to filtering and washing, solvent extraction of the filtrate is needed to recover the rare earth metals.

The above described leaching procedure was used to prepare different acid-leaching slurries in lab beakers and in plant scale reactors and will not be repeatedly described; this acid-leaching slurry was used for carrying out the following comparative examples and examples.

Comparative Example 2: Direct Extraction of Scandium from an Aqueous Acid-Leaching Slurry with a Strong Cation Ion-Exchange Resin Containing a Sulfonic Acid Functional Group, Dowex™ G-26 (H)

1 gram of Dowex™ G-26(H) strong cation ion-exchange resin (as is) containing sulfonic acid functional groups was weighed into a 150-mL beaker having a magnetic bar stirrer. 25 mL of feedstock acid-leaching slurry from Comparative Example 1 was added to the beaker. The resin and slurry mixture was agitated with the magnetic stirrer for about one hour. The resin and slurry mixture was then filtered to produce a raffinate filtrate. The filtrate was analyzed with ICP-OES, and the results are tabulated in Table 1. The concentration of scandium was only reduced from 95.9 ppm in the feedstock slurry to 90.5 ppm in the raffinate filtrate, with a recovery of only about 5.6%. Without reduction of ferric ions to ferrous ions, the strong cation ion-exchange resin having sulfonic acid groups was quickly saturated by the ferric ions and other high-valance metal ions ($Ti^{4+}$), and the resin became inactive for selective uptake of scandium ions from the acid-leaching slurry.

Comparative Example 3: Direct Extraction of Scandium from an Aqueous Acid-Leaching Slurry with a Weak Cation Ion-Exchange Resin, Amberlite™ IRC-7481

1 gram of Amberlite™ IRC-7481 cation ion-exchange resin (as is) containing iminodiacetic acid functional groups was weighed into a 150-mL beaker having a magnetic bar stirrer. 25 mL of feedstock acid-leaching slurry from Comparative Example 1 was added to the beaker. The resin and slurry mixture was agitated with the magnetic stirrer for about one hour. The resin and slurry mixture was then filtered to produce a raffinate filtrate. The filtrate was then analyzed with ICP-OES, and the results are tabulated in Table 1. The concentration of scandium was only reduced from 95.9 ppm in the feedstock slurry to 93.1 ppm in the raffinate filtrate, with a recovery of only about 2.9%. Without reduction of ferric ions to ferrous ions, the chelating cation ion-exchange resin having iminodiacetic acid groups was quickly saturated by the ferric ions and other high-valance metal ions ($Ti^{4+}$), so the resin became inactive for selective uptake of scandium from the acid-leaching slurry, which further confirms the conclusions from U.S. Pat. No. 4,816,233 that cation exchange resins (Amberlite™ IRC-7481) containing functional groups of iminodiacetic acid, similar to the Amberlite™ IRC-718 used in U.S. Pat. No. 4,816,233, are not effective to uptake scandium when the molar ratio of ($[Fe^{3+}]+[Ti^{4+}]$) to $[Sc^{3+}]$ is high, for example, in the feedstock slurry more than 75.3:1. In the patent disclosure of U.S. Pat. No. 4,816,233, trivalent $Fe^{3+}$ and tetravalent $Mn^{4+}$ were reduced to divalent $Fe^{2+}$ and $Mn^{2+}$ ions which allowed selective uptake of scandium ions by Amberlite™ 718 (iminodiacetic acid functional groups).

Example 4: Direct Extraction of Scandium from an Aqueous Acid-Leaching Slurry with an Ion-Exchange Resin Having Phosphoric Functional Groups, Purolite® S957

DEHPA (di-2-ethylhexyl phosphoric acid) is a very effective liquid extractant, as discussed in the Description of Related Art. It is typically diluted with a hydrocarbon solvent, such as diesel, kerosene, or mineral spirits, and provided with a modifier of a high molecular weight alcohol. However, solvent extraction with a liquid organic extractant suffers shortcomings such as solvent loss, crud formation, emulsions, and difficulty in achieving a complete organic-aqueous phase separation. To overcome these shortcomings of solvent extraction, the present invention utilizes an immobilized extractant that has functional groups that are similar to those of DEHPA. Purolite S957 is one commercial product that contains phosphoric acid functional groups which are chemically bonded to the polymer matrix. The immobilized phosphoric acid functional groups in the cation exchange resin, Purolite® S957, have been found to perform similarly in extracting valuable metal(s), such as rare earth metals, without suffering the aforementioned shortcomings of solvent extraction involving liquid organic solvent.

1 gram of Purolite® S957 cation ion-exchange resin (as is) containing phosphoric acid functional groups was weighed into a 150-mL beaker having a magnetic bar stirrer. 25 mL of feedstock acid-leaching slurry from Comparative Example 1 was added to the beaker. The resin and slurry mixture was agitated with the magnetic stirrer for about one hour. The resin and slurry mixture was then filtered to produce a raffinate filtrate. The filtrate was then analyzed with ICP-OES, and the results are tabulated in Table 1. The concentration of scandium was reduced from 95.9 ppm in the feedstock slurry to 38.1 ppm in the raffinate filtrate, for a recovery of about 60.3%, much better than Dowex™ G-26(H) and Amberlite™ IRC-7481. Without reduction of ferric ions to ferrous ions, the cation ion-exchange resin of Purolite S957 that has phosphoric acid groups can selectively uptake scandium from the acid-leaching slurry, although not completely.

Though Purolite® S957 containing phosphoric acid functional groups performs superiorly over both Dowex™ G-26 (H) containing sulfonic acid functional groups and Amberlite™ IRC-7481 containing iminodiacetic acid functional groups, a 60.3% recovery of scandium needs to be further improved for a commercially viable process. It has been found that, as illustrated in the following examples, a composite extractant-enhanced polymer resin can be utilized to successfully achieve a higher than 60% scandium recovery and at the same time, successfully overcome the shortcomings of solvent extraction, such as solvent loss, difficulties in achieving a complete organic-aqueous phase separation, emulsions, and crud formation.

TABLE 1

ICP-OES Analytical Results for Feedstock and Raffinate Slurries from Comparative Examples 1-3 and Example 4

| Example | | Li | Be | B | Na | Mg | Al | Si | P |
|---|---|---|---|---|---|---|---|---|---|
| Comp. Example 1 | Feedstock | 55.6 | <0.812 | 16.14 | >1562 | 315.3 | 432.9 | 226.3 | 5220 |
| Comp. Example 2 | DOWEX ™ G-26(H) | 68.6 | 1.537 | 15.53 | <68.3 | 272.5 | 226.3 | 303.8 | 351.4 |
| Comp. Example 3 | Amberlite ™ IRC-7481 | 53.8 | 1.686 | 15.52 | <68.3 | 307.4 | 427.3 | 315.9 | <29.31 |
| Example 4 | Purolite ® S957 | 82.5 | <0.812 | 15.07 | <68.3 | 307.3 | 378.7 | 325.8 | 826 |

TABLE 1-continued

ICP-OES Analytical Results for Feedstock and Raffinate Slurries from Comparative Examples 1-3 and Example 4

| | | S | K | Ca | Sc | Ti | V | Cr | Mn |
|---|---|---|---|---|---|---|---|---|---|
| Comp. Example 1 | Feedstock | >51283 | 955 | 1103 | 95.9 | 916 | 11.9 | 22.69 | 212.2 |
| Comp. Example 2 | DOWEX™ G-26(H) | >49812 | 418.6 | 911 | 90.5 | 871 | 11.43 | 20.32 | 187.7 |
| Comp. Example 3 | Amberlite™ IRC-7481 | >49408 | <24.94 | 1067 | 93.1 | 883 | 11.6 | 21.99 | 205.3 |
| Example 4 | Purolite® S957 | >82558 | 901 | 1078 | 38.13 | 292.7 | 11.81 | 23.1 | 216.1 |

| | | Fe | Co | Ni | Cu | Zn | Ga | As | Sr |
|---|---|---|---|---|---|---|---|---|---|
| Comp. Example 1 | Feedstock | >7944 | 4.758 | 10.32 | 7.41 | 14.7 | 5.38 | 2.897 | 6 |
| Comp. Example 2 | DOWEX™ G-26(H) | >9367 | 5.81 | 9.25 | 6.95 | 13.58 | 3.712 | <2.632 | 5.73 |
| Comp. Example 3 | Amberlite™ IRC-7481 | >7689 | 5.59 | 9.75 | 7.18 | 14.48 | 6.71 | <2.632 | 5.91 |
| Example 4 | Purolite® S957 | >6580 | 4.19 | 9.02 | 7.18 | 14.63 | 4.822 | 6.38 | 5.69 |

| | | Y | Zr | Nb | Mo | Cd | In | Sn | Ba |
|---|---|---|---|---|---|---|---|---|---|
| Comp. Example 1 | Feedstock | 27.03 | 21.94 | 7.41 | 3.813 | 2.13 | 1416 | <0.846 | 3.671 |
| Comp. Example 2 | DOWEX™ G-26(H) | 21.45 | 21.31 | 7.88 | 2.726 | 2.612 | 1017 | <0.846 | 3.645 |
| Comp. Example 3 | Amberlite™ IRC-7481 | 26.33 | 20.72 | 6.33 | 3.732 | 2.508 | 1134 | <0.846 | 3.664 |
| Example 4 | Purolite® S957 | 27.69 | 6.88 | 6.23 | 2.451 | 2.403 | 621 | <0.846 | 3.717 |

| | | La | Hf | W | Hg | Pb | Bi | Ce | Nd |
|---|---|---|---|---|---|---|---|---|---|
| Comp. Example 1 | Feedstock | 2.948 | <0.761 | <0.2856 | 4.2 | 640 | <3.527 | 92.3 | 7.21 |
| Comp. Example 2 | DOWEX™ G-26(H) | 1.793 | 0.789 | 0.667 | 1.744 | >1907 | <3.527 | 65.2 | 6.09 |
| Comp. Example 3 | Amberlite™ IRC-7481 | 2.66 | <0.761 | <0.2856 | 4.786 | >1730 | 5.63 | 88.8 | 7.76 |
| Example 4 | Purolite® S957 | 2.815 | <0.761 | 1.081 | 2.972 | 494.4 | 4.545 | 95.5 | 7.47 |

| | | Sm | Gd | Yb | Th | U |
|---|---|---|---|---|---|---|
| Comp. Example 1 | Feedstock | 3.187 | 5.83 | 4.203 | 64.5 | 15.2 |
| Comp. Example 2 | DOWEX™ G-26(H) | 2.395 | 4.588 | 3.654 | 61.4 | 12.7 |
| Comp. Example 3 | Amberlite™ IRC-7481 | 2.903 | 5.45 | 4.152 | 61.6 | 16.2 |
| Example 4 | Purolite® S957 | 2.507 | 5.58 | 4.312 | 31.62 | 11.13 |

Examples 5-9: Preparation of a Composite Extractant-Enhanced Polymer Resin

A. Preparation of a Mixture Solution of Ethanol and DEHPA 125 mL of analytical grade ethanol and 125 mL DEHPA were measured into a 400-mL beaker having a magnetic bar stirrer, followed by 30 minutes of agitation with the magnetic stirrer. A similar procedure was followed to prepare the mixture solution of DEHPA and ethanol for the experiments in Part B, as needed, without further repeated descriptions.

B. Preparation of a Composite Extractant-Enhanced Polymer Resin

Examples 5 and 6 detail the preparation of a composite extractant-enhanced polymer resin. DEHPA is used as the extractant, and Dow Chemical's Amberlite™ XAD7HP and XAD1180N are used as the polymer resins. These resins have no specific functional groups. 50 grams of Amberlite™ XAD7HP polymer resin was weighed into a 150-mL beaker. About 75 mL of the mixture solution of DEHPA and ethanol was added to the beaker. The polymer resin was soaked in the mixture solution for about 3 hours to produce the composite. The composite was filtered from the mixture solution by gravity and washed with 30 mL of ethanol. The obtained composite is designated as Amberlite™ XAD7HP-DEHPA-Wet. About one half of the wet composite was oven-dried at about 110° C. for at least two hours. The obtained sample is designated as Amberlite™ XAD7HP-DEHPA-Dry. The same procedure was repeated to prepare Amberlite™ XAD1180N-DEHPA-Wet and Amberlite™ XAD 1180N-DEHPA-Dry.

Examples 7 to 9 detail the preparation of other composite extractant-enhanced functional ion-exchange resins. DEHPA was used as the extractant while Dowex™ G-26(H), Amberlite™ IRC-7841, and Purolite® S957 were used as the functional ion-exchange resin. The procedure described above for examples 5 and 6 was used to prepare Dowex™

G-26(H)-DEHPA-Wet, Dowex™ G-26(H)-DEHPA-Dry, Amberlite™ IRC-7461-DEHPA-Wet, Amberlite™ IRC-7461-DEHPA-Dry, Purolite® S957-DEHPA-Wet, and Purolite® S957-DEHPA-Dry. The DEHPA loadings for these five composite extractant-enhanced polymer resins were analyzed by x-ray fluorescence (XRF) and are listed in Table 2.

TABLE 2

DEHPA Loadings of Composites of DEHPA-Enhanced Polymer Resins

| Examples | Sample Name | DEHPA % Dry | DEHPA % Wet |
|---|---|---|---|
| Example 5 | XAD7HP-DEHPA | 22.41 | 8.904 |
| Example 6 | XAD1180N-DEHPA | 29.17 | 7.207 |
| Example 7 | Dowex ™ G-26(H)-DEHPA | 8.873 | 8.203 |
| Example 8 | Amberlite ™ IRC-7481-DEHPA | 6.641 | 6.192 |
| Example 9 | Purolite ® S957-DEHPA | 20.22 | 13.44 |

Examples 10-17: Direct Extraction of Scandium from an Aqueous Acid-Leaching Slurry Containing a High Concentration of Non-Reduced Ferric Ions Using a Composite Extractant-Enhanced Polymer Resin 1 gram of the composite extractant-enhanced polymer resin, Dowex™ G-26(H)-DEHPA-Wet, containing sulfonic acid functional groups and DEHPA, was weighed into a 150-mL beaker having a magnetic bar stirrer. 25 mL of feedstock acid-leaching slurry from Comparative Example 1 was added to the beaker. The composite and slurry mixture was agitated with the magnetic stirrer for about one hour. The composite and slurry mixture was then filtered to produce a raffinate filtrate. The filtrate was then analyzed with ICP-OES, and the results are tabulated in Table 3, Example 10. In Tables 3-6, all of the monovalent cations and divalent cations are not listed because these monovalent and divalent ions are not competing for extraction with the rare earth metal ions which are mainly trivalent. Also, some minor elements (very low concentrations) are not listed in these tables. The concentration of scandium was reduced from 95.9 ppm in the feedstock slurry to 70.4 ppm in the raffinate filtrate, for a recovery of about 26.6%, which was enhanced from 5.6% in Comparative Example 2 where only Dowex™ G-26(H) resin was used. In Example 11, Dowex™ G-26(H)-DEHPA-Dry was used, and the scandium concentration was reduced from 95.9 ppm to 86.9 ppm, for a recovery of 9.4% which is enhanced from 5.6% in Comparative Example 2 where only Dowex™ G-26(H) resin was used. However, the recovery of scandium by the composite extractant-enhanced Dowex™ G-26(H) was still somewhat low, mainly because of the excess of trivalent cations, like ferric ions ($Fe^{3+}$) and tetravalent cations like $Ti^{4+}$ ions, $([Fe^{3+}]+[Ti^{4+}])/[Sc^{3+}]>75.3$, present in the feedstock slurry.

Examples 12 and 13 show that composite extractant-enhanced porous resins, Amberlite™ XAD7HP-DEHPA-Dry and XAD1180N-DEHPA-Dry, reduced the scandium concentration from 92.1 ppm to 63.3 ppm and 60.1 ppm, respectively, which translates into recoveries of 31.3% and 34.7%, respectively. The resins of Amberlite™ XAD7HP and Amberlite™ XAD1180N without the addition of an extractant show no propensity for uptaking scandium ions. Therefore, these composite extractant-enhanced porous resins have enhanced capability in the uptake of scandium ions from an acid-leaching slurry having a ratio of $([Fe^{3+}]+[Ti^{4+}])$ to $[Sc^{3+}]$ greater than 231:1.

The composite extractant-enhanced polymer resin, Amberlite™ IRC-7481-DEHPA-Dry, reduced the scandium concentration from 92.1 ppm to 38.5 ppm (Example 14), a 58.2% scandium recovery with a ratio of $([Fe^{3+}]+[Ti^{4+}])$ to $[Sc^{3+}]$ greater than 231:1 in the feedstock slurry, which is enhanced from a 2.9% scandium recovery in Comparative Example 3 where only Amberlite™ IRC-7481 was used. When the amount of this composite was doubled to 2 grams, as shown in Example 16, the scandium concentration was further reduced from 87.4 ppm to 15.9 ppm, a scandium recovery of 81.8% with a ratio of $([Fe^{3+}]+[Ti^{4+}])$ to $[Sc^{3+}]$ greater than 234:1 in the feedstock slurry.

The composite extractant-enhanced polymer resin, Purolite® S957-DEHPA-Dry reduced the scandium concentration from 92.1 ppm to 15.07 ppm (Example 15), a 83.6% scandium recovery with a ratio of $([Fe^{3+}]+[Ti^{4+}])$ to $[Sc^{3+}]$ greater than 231:1 in the feedstock slurry, which is enhanced from the 60.3% scandium recovery in Example 4 where only Purolite S957 resin was used. When the amount of this composite was doubled to 2 grams, as shown in Example 17, the scandium concentration was further reduced from 87.4 ppm to 0.69 ppm, a scandium recovery of 99.2% with a ratio of $([Fe^{3+}]+[Ti^{4+}])$ to $[Sc^{3+}]$ greater than 234:1 in the slurry.

In summary, Examples 10 to 17 demonstrate that a composite extractant-enhanced polymer resin enhances the capability in uptake of scandium ions from an acid-leaching slurry that contains a large amount of excess trivalent ions such as ferric ions and tetravalent ions such as titanium ions.

TABLE 3

Elemental Analysis for Direct Extraction of Scandium from Non-Reduced Acid-Leaching Slurry by a Composite Extractant-Enhanced Polymer Resin

| Example | Comp. | Form | Slurry:Resin | Sc | Ti | Fe | La | Ce | Nd | Sm | Gd | Yb |
|---|---|---|---|---|---|---|---|---|---|---|---|---|
| | Feed | | | 95.9 | 916 | >7944 | 2.948 | 92.3 | 7.21 | 3.187 | 5.83 | 4.203 |
| Ex. 10 | DOWEX ™ G-26(H)-DEHPA | Wet | 25:1 | 70.4 | 885 | >7510 | 1.972 | 64.7 | 6.39 | 2.103 | 4.751 | 3.629 |
| Ex. 11 | DOWEX ™ G-26(H)-DEHPA | Dry | 25:1 | 86.9 | 902 | >7553 | 2.034 | 61.1 | 5.71 | 2.326 | 4.485 | 3.569 |
| | Feed | | | 92.1 | >1995 | >24092 | 1.813 | 95.2 | 6.06 | 2.584 | 8.27 | 3.255 |
| Ex. 12 | Amberlite ™ XAD7HP-DEHPA | Dry | 25:1 | 63.3 | >1923 | >23176 | 1.775 | 94.4 | 5.81 | 1.872 | 8.26 | 3.069 |
| Ex. 13 | Amberlite ™ XAD1180N-DEHPA | Dry | 25:1 | 60.1 | >1855 | >22236 | 1.637 | 89.7 | 5.72 | 2.425 | 7.61 | 3.018 |

TABLE 3-continued

Elemental Analysis for Direct Extraction of Scandium from Non-Reduced
Acid-Leaching Slurry by a Composite Extractant-Enhanced Polymer Resin

| Example | Comp. | Form | Slurry:Resin | Sc | Ti | Fe | La | Ce | Nd | Sm | Gd | Yb |
|---|---|---|---|---|---|---|---|---|---|---|---|---|
| Ex. 14 | Amberlite™ IRC-7481-DEHPA | Dry | 25:1 | 38.55 | >1760 | >21689 | 1.51 | 86.3 | 5.63 | 2.253 | 7.37 | 2.795 |
| Ex. 15 | Purolite® S957-DEHPA | Dry | 25:1 | 15.07 | 597 | >18102 | 1.44 | 88.3 | 5.44 | <1.682 | 6.44 | 2.964 |
| Feed | | | | 87.4 | >1940 | >23117 | 1.666 | 86.9 | 6.33 | <1.766 | 8.12 | 3.009 |
| Ex. 16 | Amberlite™ IRC-7481-DEHPA | Dry | 25:2 | 15.9 | >1901 | >24200 | 1.731 | 96.4 | 6.51 | <1.766 | 8.58 | 3.139 |
| Ex. 17 | Purolite® S957-DEHPA | Dry | 25:2 | 0.69 | 252.1 | >16328 | 1.61 | 93.4 | 6.18 | <1.766 | 6.48 | 3.192 |

Examples 18-25: Direct Extraction of Scandium from an Aqueous Acid-Leaching Solution Containing Non-Reduced Ferric Ions with a Composite Extractant-Enhanced Polymer Resin When the ratio of ($[Fe^{3+}]+[Ti^{4+}]$) to $[Sc^{3+}]$ was reduced to a level of about 8.2:1 in the acid-leaching solution, as is the case with the feedstock used for Examples 18 to 20 (Table 4), Purolite® S957 resin containing phosphoric acid functional groups reduced the scandium ion concentration from 124.9 ppm to less than 0.0074 ppm, an approximately 100% scandium recovery (Example 19). However, Dowex™ G-26 (H), which is a strong cation exchange resin containing sulfonic acid functional groups, only reduced the scandium concentration from 124.9 ppm down to 46.91 ppm, a 62.4% scandium ion recovery (Example 18). Amberlite™ IRC-7481 containing iminodiacetic acid functional groups reduced the scandium concentration from 124.9 ppm to 28.23 ppm, a 77.4% scandium recovery (Example 20), which is consistent with the teaching from the disclosure of U.S. Pat. No. 4,816,233. An extractant immobilized on a polymer matrix like Purolite® S957 that has phosphoric acid functional groups (similar to DEHPA's functional group) extracts valuable metals such as scandium from an acid-leaching solution/slurry selectively, as DEHPA does in the solvent extraction process. Purolite® S957 extraction overcomes the shortcomings of solvent extraction, such as solvent loss, difficulties in achieving a complete organic-aqueous phase separation, emulsion formation, and crud formation.

The feedstock for Examples 21-25 also had a ratio of ($[Fe^{3+}]+[Ti^{4+}]$) to $[Sc^{3+}]$ of 8.2:1. Example 21 shows that the composite extractant-enhanced polymer resin, Dowex™ G-26(H)-DEHPA, reduces scandium ion concentration from 125.4 ppm to 15.89 ppm, an 87.3% scandium recovery (Example 22), which is enhanced from the 62.4% recovery in Example 18 where only a Dowex™ G-26(H) resin was used. The composite extractant-enhanced polymer resin, Amberlite™ IRC-7481-DEHPA, shows a complete uptake of scandium from 125.4 ppm to <0.0037 ppm (Example 23), which is enhanced from a recovery of 77.4% in Example 20 where only Amberlite™ IRC-7481 was used. The composite extractant-enhanced polymer resin, Purolite® S957-DEHPA, has a complete uptake of scandium ions from an acid-leaching solution that has a ratio of ($[Fe^{3+}]+[Ti^{4+}]$) to $[Sc^{3+}]$ of 8.2:1, since Purolite® S957 uptakes 100% scandium by itself (Example 19).

The composite extractant-enhanced polymer resins, Amberlite™ XAD1180N-DEHPA and Amberlite™ XAD7HP-DEPHA, as shown in Examples 24 and 25, reduced the scandium from 125.4 ppm to 40.18 ppm and 1.46 ppm, respectively, for a recovery of 68.0% and 98.8%, respectively, while Amberlite™ XAD1180N and Amberlite™ XAD7HP used alone have no activity for uptaking scandium ions from acid-leaching slurries.

Examples 18 to 25 further show that a composite extractant-enhanced polymer resin, in this case, DEHPA-enhanced polymer resin, is capable of a direct extraction of valuable metals such as scandium ions from an acid-leaching solution or slurry and, at the same time, overcomes the shortcomings of solvent extractions in solvent loss, difficulties in achieving a complete solvent-aqueous phase separation, emulsions, crud formation, etc.

TABLE 4

Direct Extraction of Scandium from an Aqueous Acid-Leaching Solution
having a Relatively High Concentration of Non-Reduced Ferric Ions

| Example | | | Sc | Ti | Fe | Y | La | Ce | Nd | Sm | Gd | Yb |
|---|---|---|---|---|---|---|---|---|---|---|---|---|
| | | Feed | 124.9 | 8.99 | 1269 | 44.76 | 3.172 | 8.1 | 7.53 | 1.847 | 4.261 | 5.54 |
| Ex. 18 | DOWEX™ G-26(H) | as is | 46.91 | 7.34 | 677 | 7.09 | 0.2468 | 2.789 | 1.965 | <1.766 | 0.765 | 1.817 |
| Ex. 19 | Purolite® S957 | as is | <0.0074 | <0.09999 | 29.93 | 18.11 | 1.291 | 4.659 | 3.732 | <1.766 | 1.279 | 2.913 |
| Ex. 20 | Amberlite™ IRC-7481 | as is | 28.23 | <0.0999 | 51.9 | 38.72 | 2.403 | 6.44 | 6.18 | 1.992 | 2.952 | 4.933 |
| | | Feed | 125.4 | 9.11 | >1262 | 47.5 | 3.401 | 7.35 | 7.08 | 2.273 | 4.441 | 5.4 |
| Ex. 21 | DOWEX™ G-26(H)-DEHPA | Dry | 15.89 | 5.61 | 237.3 | 1.308 | <0.0091 | <0.859 | 0.948 | <0.883 | 0.0619 | 0.692 |

TABLE 4-continued

Direct Extraction of Scandium from an Aqueous Acid-Leaching Solution having a Relatively High Concentration of Non-Reduced Ferric Ions

| Example | | | Sc | Ti | Fe | Y | La | Ce | Nd | Sm | Gd | Yb |
|---|---|---|---|---|---|---|---|---|---|---|---|---|
| Ex. 22 | Purolite ® S957-DEHPA | Dry | <0.0037 | <0.0037 | 9.52 | <0.0038 | 0.0409 | <0.859 | 0.851 | <0.883 | 0.0619 | 0.567 |
| Ex. 23 | Amberlite™ IRC-7481-DEHPA | Dry | <0.0037 | <0.0499 | 9.8 | 6.16 | 0.576 | 1.233 | 1.412 | <0.883 | 0.4947 | 0.888 |
| | | Feed | 125.4 | 9.11 | >1262 | 47.5 | 3.401 | 7.35 | 7.08 | 2.273 | 4.441 | 5.4 |
| Ex. 24 | XAD1180N-DEHPA | Dry | 40.18 | 7.24 | >1026 | 38.61 | 2.757 | 5.76 | 5.92 | 2.129 | 3.508 | 4.499 |
| Ex. 25 | XAD7HP-DEHPA | Dry | 1.46 | 2.412 | 519 | 20.06 | 2.273 | 4.901 | 4.555 | 1.14 | 2.005 | 2.516 |

Examples 26-29: Direct Extraction of Scandium from an Aqueous Acid-Leaching Solution in which Ferric Ions were Reduced into Ferrous Ions with a Composite Extractant-Enhanced Polymer Resin As shown in Table 5, ferric ions in the acid-leaching solution were reduced to ferrous ions for Examples 26 to 29. Amberlite™ XAD1180N and Amberlite™ XAD7HP resins used alone do not show any activity in uptaking scandium ion from the acid-leaching solution in which the ferric ions were reduced to ferrous ions, as shown in Examples 26 and 27, respectively. The composite extractant-enhanced polymer resins, Amberlite™ XAD1180N-DEHPA or Amberlite™ XAD7HP-DEHPA, demonstrate a complete uptake of scandium ions from the slurry in which ferric ions were reduced to ferrous ions, as shown in Examples 28 and 29, respectively. Examples 26 to 29 further illustrate that a composite extractant-enhanced polymer resin uptakes scandium ions and overcomes the shortcomings of solvent extraction in solvent loss, difficulties in achieving a complete solvent and aqueous separation, emulsions, crud formation, etc.

TABLE 5

Direct Extraction of Scandium from an Aqueous Acid-Leaching Solution having a High Concentration of Iron Ions as Ferrous Ions

| Example | | | Sc | Ti | Fe | Y | La | Ce | Nd | Sm | Gd | Yb |
|---|---|---|---|---|---|---|---|---|---|---|---|---|
| | | Feed | 99.4 | 2.166 | 733 | 54.6 | 4.064 | 7.59 | 1057 | 2.403 | 4.51 | 6.25 |
| Ex. 26 | Amberlite™ XAD1180N | as is | 93.2 | <0.0999 | 620 | 43.58 | 3.299 | 6.28 | 879 | <1.766 | 3.496 | 5.17 |
| Ex. 27 | Amberlite™ XAD7HP | as is | 96.8 | <0.0999 | 638 | 45.68 | 3.462 | 7.22 | 885 | <1.766 | 3.710 | 5.33 |
| | | Feed | 99.4 | 2.166 | 733 | 54.6 | 4.064 | 7.59 | 1057 | 2.403 | 4.51 | 6.25 |
| Ex. 28 | Amberlite™ XAD1180N-DEHPA | Dry | <0.0074 | <0.0999 | 609 | 34.15 | 2.89 | 4.85 | 756 | <1.766 | 2.729 | 4.236 |
| | | Feed | 118.6 | 1.432 | 1144 | 45.12 | 3.113 | 7.13 | 7.72 | <1.766 | 4.074 | 5.72 |
| Ex. 29 | Amberlite™ XAD7HP-DEHPA | Dry | <0.0074 | <0.0999 | 2.677 | 2.618 | 2.769 | 6.29 | 6.3 | <1.766 | 1.372 | 1.176 |

Example 30: Direct Extraction of Scandium from an Aqueous Acid-Leaching Solution Containing a High Concentration of Non-Reduced Ferric Ions with a Cation Ion-Exchange Resin with Phosphoric Acid Functional Groups (a Column Process)

7.8 g of Purolite® S957 resin (10 mL) was added into an analytical glass burette used as a column. The bottom of the analytical glass burette was connected to a Masterflex® Tubing (S/L 14). The resin bed of Purolite 5957® was filled with DI water, and the air bubbles were removed from the resin bed. An acid-leaching solution was carefully added into the analytical glass burette (column). The composition of the acid-leaching solution is listed in Table 6, and its ratio of ($[Fe^{3+}]+[Ti^{4+}]$) to $[Sc^{3+}]$ is about 75:1. The acid-leaching solution was pumped through the resin bed at a flow rate of 0.75 mL/min (4.5 bed volumes per hour) and the raffinate effluent samples were collected at 30 minute intervals. Analysis of the raffinate effluents and the extraction results are tabulated in Table 6 and shown in FIG. 1. In the first 30 minutes, 98% of scandium ions were taken up by the Purolite S957 resin, with a loading of about 368 ppm Sc on the Purolite® S957 resin. At the same time, about 91% ferric ions were also taken up by the resin, which results in a 353:1 ratio of [Fe]/[Sc] in the effluent. However, after 30 minutes, as more ferric ions were loaded on to the Purolite® S957 resin's cation exchange sites, the scandium extraction efficiency decreased substantially to 85%, 60%, and 42% at 60, 90, and 120 minutes, respectively. The ratio of [Fe]/[Sc] in the effluent decreased to 102:1, 45:1, and 31:1, accordingly, while a corresponding scandium loading on the resin increased to 1007, 1684, and 2313 ppm.

This example demonstrates that Purolite S957 that has phosphoric acid functional groups can extract about 98% scandium from an acid-leaching slurry that contains at least 13,339 ppm ferric ions with a scandium loading of about 368 ppm.

TABLE 6

Elemental Analysis for the Raffinate at Different Times on Stream When Using Purolite S957 to Extract Rare Earth Metals from an Acid-Leaching Solution that Contains a Large Amount of Ferric Ions

| Time, min | Sc | Ti | Fe | Y | La | Ce | Nd | Sm | Gd | Yb |
|---|---|---|---|---|---|---|---|---|---|---|
| Feed | 166.5 | >1865 | >13399 | 29.69 | 3.022 | 69.1 | 7.46 | 3.27 | 6.84 | 5.09 |
| 30 | 2.9 | >22.09 | >1270 | 8.8 | 0.861 | >.2147 | 1.88 | 0.797 | 1.352 | 1.279 |
| 60 | 24.61 | >127.5 | >3125 | >19.46 | 1.975 | >49.40 | 4.543 | 1.99 | 3.543 | 2.81 |
| 90 | 66.1 | >276.2 | >3701 | >19.39 | 1.977 | >47.56 | 4.638 | 2.089 | 4.026 | 2.708 |
| 120 | 96.6 | >424.8 | >3756 | >17.45 | 1.846 | >43.60 | 4.295 | 1.938 | 3.871 | 2.478 |

Example 31: Direct Extraction of Scandium from an Aqueous Acid-Leaching Solution Containing a High Concentration of Non-Reduced Ferric Ions with a Composite Extractant-Enhanced Polymer Resin with Phosphoric Acid Functional Groups 10 grams of the composite extractant-enhanced polymer resin, Purolite S957-DEHPA-Dry, was added into an analytical glass burette. After contacting water, the volume of the analytical glass burette (resin bed) was about 23 mL. The bottom of the analytical glass burette was connected to a Masterflex® Tubing (L/S 14). The resin bed was filled with DI water, and the air bubbles were removed from the resin bed. An acid-leaching solution was added into the analytical glass burette. The composition of acid-leaching solution is listed in Table 7, and its ratio of ($[Fe^{3+}]+[Ti^{4+}]$) to $[Sc^{3+}]$ is about 83:1. The acid-leaching solution was pumped through the resin bed at a flow rate of 0.75 mL/min (~2 bed volumes per hour). Raffinate effluent samples were collected at 30 minute intervals. Analysis of the raffinate effluents and the extraction results are tabulated in Table 7 and illustrated in FIG. 1. In the first 150 minutes, 98% or more of the scandium ions were taken up by the Purolite S957-DEHPA, with a loading of as high as 2249 ppm Sc on the Purolite® S957-DEHPA, which is 6.4 times more efficient than Purolite® S957 resin used alone. During this period of time, the percentage of ferric ions that were loaded onto the resin decreased from 100% (30 min), to 93% (60 min), to 67% (90 min), to 39% (120 min), and to 26% (150 min). More importantly, the ratio of [Fe]/[Sc] in the effluent was extremely high, about 30,000 or higher for the first 90 minutes and decreased to about 3000 at 120 and 150 minutes. The loading of an extractant, DEHPA, onto the Purolite® S957 resin enhanced the capability of the Purolite® S957 resin to achieve selective and complete uptake of scandium ions from the acid-leaching slurry containing a high concentration of ferric ions. This is particularly useful for extracting a low concentration of scandium from an acid-leaching slurry or solution that contains a high concentration of trivalent cations such as ferric ions and tetravalent cations like titanium.

Furthermore, after 150 minutes, the concentration of ferric ions was basically the same as that of the feedstock solution, suggesting that there was no further uptake of ferric ions. However, the composite, Purolite® S957-DEHPA, continued to uptake scandium ions with an extraction efficiency of 90% (180 min), 78% (210 min), and 67% (240 min), and a ratio of [Fe]/[Sc] in the effluent of 787 (180 min), 346 (210 min), and 230 (240 min). These results suggest that the composite extractant-enhanced polymer resin (Purolite® S957-DEHPA) has the ability of exchanging out ferric ions for scandium ions with a very high selectivity. After 240 minutes on stream, about 4714 ppm scandium was loaded onto the composite Purolite® S957-DEHPA.

This example demonstrates that composite extractant-enhanced polymer resins are highly suitable for economical extraction of rare earth metal ions from a stream of acid-leaching slurry or solution, even if the stream of aqueous slurry or solution contains large amounts of ferric ions, without reducing the ferric ions to ferrous ions. At the same time, the composite extractant-enhanced polymer resin allows enhanced extraction of rare earth metals from a stream of acid-leaching slurry or solution and overcomes the shortcomings of solvent extraction in solvent loss, difficulties of achieving a complete organic-aqueous phase separation, formation of emulsions, and crud formation.

TABLE 7

Elemental Analysis for the Raffinate at Different Times on Stream When Using Purolite ® S957-DEHPA to Extract Rare Earth Metals from an Acid-Leaching Solution that Contains a Large Amount of Ferric Ions

| Time on Stream, min | Sc | Ti | Fe | Y | La | Ce | Nd | Sm | Gd | Yb |
|---|---|---|---|---|---|---|---|---|---|---|
| Head | 154.7 | >1692 | 13946 | 27.75 | 2.761 | 62.2 | 6.41 | 3.011 | 6.25 | 4.246 |
| 30 | 0.0018 | 0.1199 | 66.4 | 0.661 | 0.0746 | 1.610 | 0.1317 | 0.0456 | 0.074 | 0.0689 |
| 60 | <0.0004 | 0.552 | 946 | 7.47 | 0.775 | >18.41 | 1.563 | 0.642 | 0.948 | 0.865 |
| 90 | <0.0004 | 5.09 | 4604 | >18.79 | 1.842 | >45.76 | 4.068 | 1.765 | 2.835 | 2.475 |
| 120 | 2.389 | >29.89 | 8528 | >20.87 | 2.014 | >50.2 | 4.757 | 2.073 | 3.758 | 2.914 |
| 150 | 2.436 | >43.65 | 10283 | >22.33 | 2.143 | >53.3 | 5.15 | 2.314 | 4.119 | 3.177 |
| 180 | 14.77 | >152.2 | 14435 | >17.76 | 1.769 | >42.57 | 4.236 | 1.836 | 3.866 | 2.543 |
| 210 | 33.84 | >215.1 | 14562 | >17.44 | 1.736 | >41.06 | 4.172 | 1.816 | 3.820 | 2.474 |
| 240 | 50.4 | >303.9 | 14402 | >17.59 | 1.745 | >41.07 | 4.113 | 1.826 | 3.831 | 2.445 |

Example 32: Direct Extraction of Scandium from a Synthetic Solution Containing about 3,000 ppm Iron Ions with a Composite Extractant-Enhanced Polymer Resin with Phosphoric Acid Functional Groups (Regenerated with Multi-Pass of Acids, Less Cost Effective)

A synthetic stream containing 24.9 ppm scandium along with 4,302 ppm nickel, 246 ppm cobalt, 2,988 ppm iron, 2,598 ppm aluminum, 207 ppm chromium, and other divalent cations, such as calcium (>20,000 ppm), copper, magnesium (>11,000 ppm), manganese, zinc, silicon, etc. was passed through a PVC column filled with about 4.25 liters of a composite extractant-enhanced polymer resin, Purolite® S957-DEHPA.

The composite extractant-enhanced polymer resin (Purolite® S957-DEHPA) was used in the previous runs in which it was loaded with scandium ions along with other undesirable cations. The scandium ions were stripped from the loaded resin using a sodium carbonate solution (about 16 liters) heated to about 80° C. for about one hour under mixing conditions. The carbonate solution that was used as a stripping solution contained about 200 grams of sodium carbonate per liter. The stripping procedure was repeated a second time.

The Sc-stripped resin was then regenerated using 10 liters sulfuric acid solution (440 grams per liter) that contained about 5% hydrogen peroxide for one hour under mixing conditions. The resin was then regenerated using a 10 liter hydrochloric acid solution (200 grams per liter) under mixing conditions for another hour. The resin was then loaded onto a PVC column and a stream of 10 liters of sulfuric acid solution (440 grams per liter) and a stream of 10 liters of hydrochloric acid (200 grams per liter) were passed through the column consecutively. After rinsing with water, the column was then used for the run described below.

About 100 liters of the synthetic solution was pumped to the top of the column for about 15 hours. At the beginning, the flow rate was relatively high and, towards the end, the flow rate was relatively low, possibly due to different pump suction forces corresponding to different liquid levels of the feed solution which was contained in a 55 gallon drum. The exhausted solution from the column, raffinate, was sampled every hour for assays. The collected raffinate solution was then added to additional scandium solution to form more feedstock solution containing scandium between 15 and 27 ppm; and this was repeated 7 times.

Figure 2:
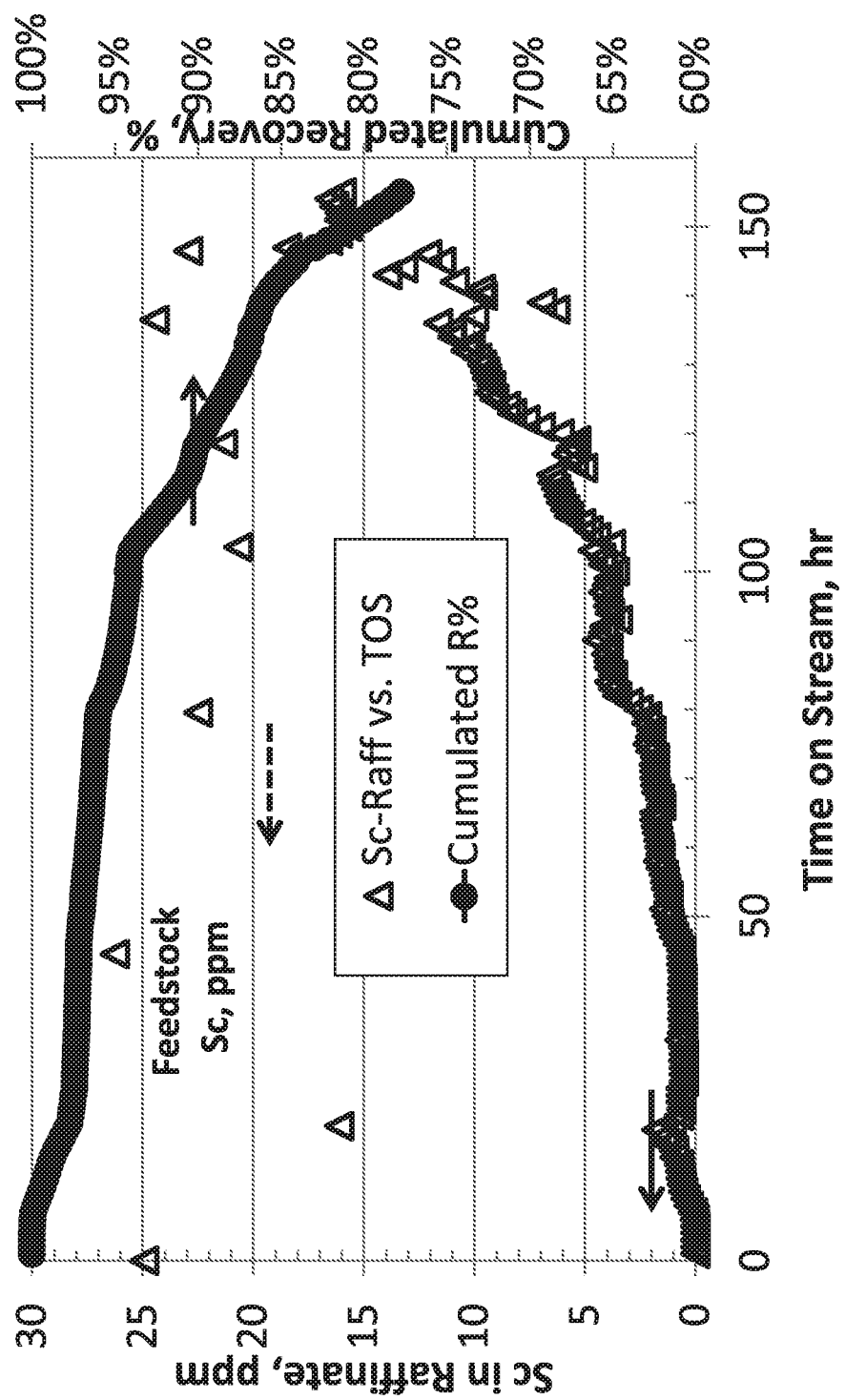
FIG. 2 is a graph showing scandium recovery when using a composite extractant-enhanced polymer resin according to the present invention in a column process for extracting rare earth metals from an acid-leaching solution that contains a large amount of ferric ions (Example 32)

The results for recovering scandium from the synthetic solution are shown in FIG. 2. Scandium ions in the feedstock are partially retained by the extractant-enhanced polymer resin, Purolite® S957-DEHPA; scandium ions in the raffinate increased with the time on stream. The initial scandium recovery was almost 100%; then the scandium recovery slowly decreased while the resin continued to be loaded with scandium ions. The resin continued to load scandium even though there were very large amounts of other trivalent cations such as iron ions (~100:1 for Fe:Sc in mass). After about 150 hours on stream, the scandium concentration in the raffinate increased to a level greater than 15 ppm; the cumulated scandium recovery at the end of the run was about 77%.

The loaded resin was then stripped with a first sodium carbonate solution using the same procedures described above. The first stripping solution contained 1,013 ppm Sc, 2.3 ppm Al, 291 ppm Ca, 1.7 ppm Co, 0.9 ppm Cr, 2.6 ppm Cu, 45 ppm Fe, 106 ppm Mg, 1.6 ppm Mn, <0.2 ppm Ni, 164 ppm Si, and 1.8 ppm Zn. Scandium and other impurities in the stripping solution were then precipitated with hydrochloric acid, followed by filtration, to produce a filtered cake. The resin was then stripped with a second sodium carbonate solution and the stripping solution contained a lower concentration of scandium; the second stripping solution may be used as a first stripping solution in the next cycle.

The resin was then subjected to the same regeneration procedures that are described in this example. The regenerated resin was then ready for the next cycle in the following example.

Example 33: Direct Extraction of Scandium from a Synthetic Solution Containing about 16,000 ppm Iron Ions with a Composite Extractant-Enhanced Polymer Resin with Phosphoric Acid Functional Groups (Regenerated with Multi-Pass of Acids, Less Cost Effective), and Followed by Stripping and Low Cost Ex-Situ Regeneration with One Pass of Hydrochloric Acid A synthetic stream containing about 9 ppm scandium along with 56 ppm nickel, 8.0 ppm cobalt, 16,145 ppm iron, 1,247 ppm aluminum, 202 ppm chromium, and other divalent cations, such as calcium (1,005 ppm), copper (1.0 ppm), magnesium (18,654 ppm), manganese (1,761 ppm), zinc (4.7 ppm), silicon (234 ppm), etc. was passed through a PVC column filled with about 4 liters of a composite extractant-enhanced polymer resin (Purolite® S957-DEHPA) that was regenerated in the previous example.

About 100 liters of the synthetic solution was pumped to the top of the column for about 10 hours. The raffinate solution was sampled every hour for assays. The collected raffinate solution was then added to additional scandium solution to form more feedstock solution that contained scandium in a concentration between 8 and 10 ppm; and this was repeated 13 times.

Figure 3:
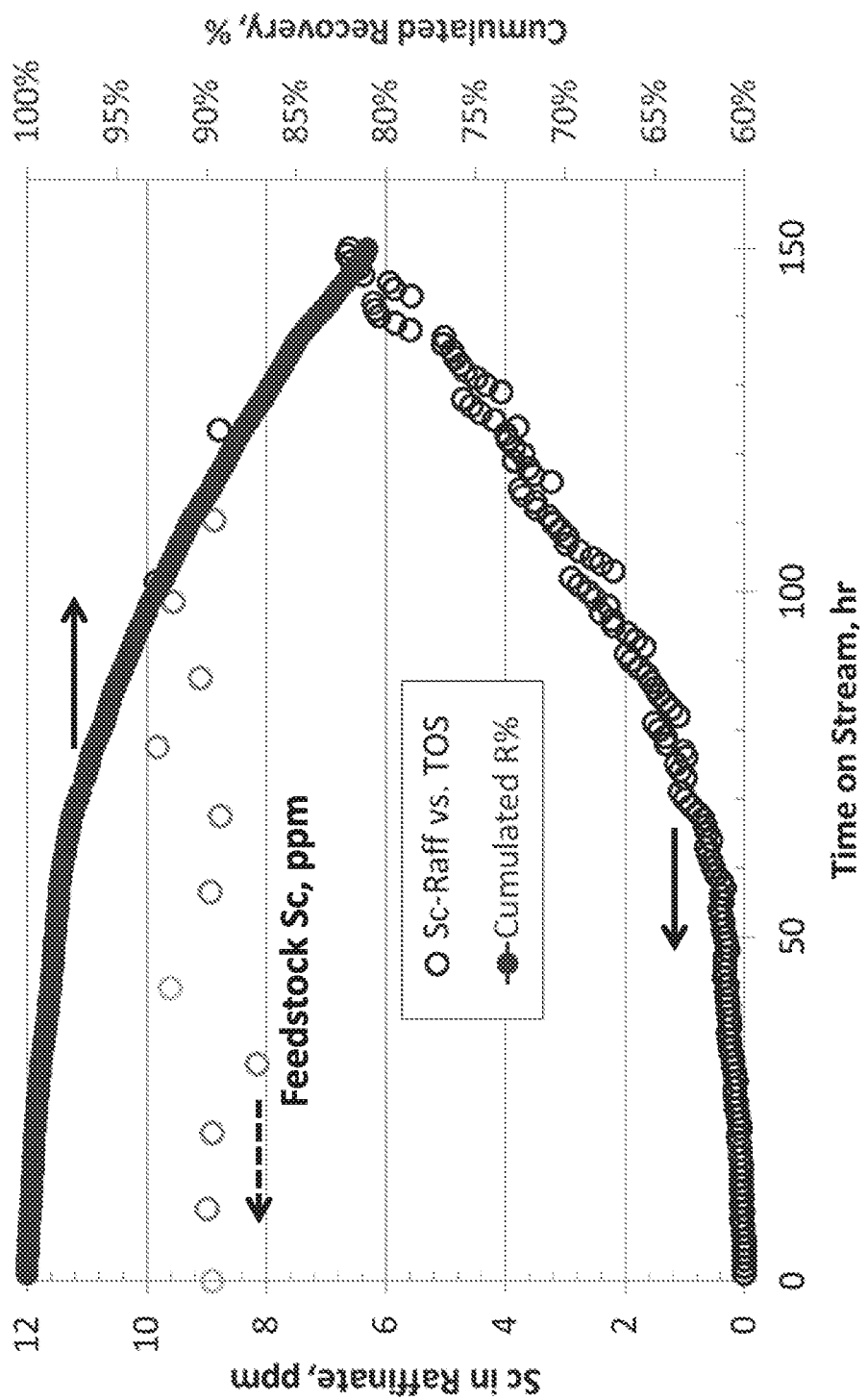
FIG. 3 is a graph showing scandium recovery when using a composite extractant-enhanced polymer resin according to the present invention in a column process for extracting rare earth metals from an acid-leaching solution that contains a large amount of ferric ions (Example 33)

The results for recovering scandium from the synthetic solution are shown in FIG. 3. Scandium ions in the feedstock were partially retained by the extractant-enhanced polymer resin, Purolite® S957-DEHPA; scandium ions in the raffinate increased with the time on stream. The initial scandium recovery was almost 100%; then scandium recovery slowly decreased while the resin continued to be loaded with scandium ions. The resin continued to load scandium even though there were very large amounts of other cations such as iron ions (>1,600:1 for Fe:Sc in mass) in the solution. After about 150 hours on stream, the scandium concentration in the raffinate increased to a level greater than 6 ppm; the cumulated scandium recovery at the end of the run was about 81%.

The loaded resin was removed from the column and was stripped at 80° C. with a first sodium carbonate solution (10.5 liters, 200 grams sodium carbonate per liter) under mixing conditions for one hour. The first stripping solution contained 905 ppm Sc, 29 ppm Al, 295 ppm Ca, <0.7 ppm Co, <0.2 ppm Cr, <0.1 ppm Cu, 78 ppm Fe, 218 ppm Mg, 3.2 ppm Mn, <0.7 ppm Ni, 258 ppm Si, and <0.5 ppm Zn. Scandium and other impurities in the stripping solution were then precipitated with hydrochloric acid, followed by filtration, to produce a filtered cake.

The loaded resin was then stripped at 80° C. with a second sodium carbonate solution (10 liters, 200 grams sodium carbonate per liter) under mixing conditions for one hour. The second stripping solution contained 326 ppm Sc, 7 ppm Al, 114 ppm Ca, <0.1 ppm Co, <0.1 ppm Cr, <0.04 ppm Cu, 20 ppm Fe, 88 ppm Mg, 0.6 ppm Mn, <0.3 ppm Ni, 79 ppm Si, and <0.2 ppm Zn. The second stripping solution may be used as the first stripping solution in the next cycle.

The resin was then regenerated by flowing a hydrochloric acid solution (200 grams per liter, 9 liters) through the column. The used hydrochloric acid solution contained 0.1 ppm Sc, 228 ppm Al, 179 ppm Ca, 0.4 ppm Co, 35 ppm Cr, 0.5 ppm Cu, 3,222 ppm Fe, 752 ppm Mg, 101 ppm Mn, <0.7 ppm Ni, 84 ppm Si, and 5.6 ppm Zn. The regenerated resin was ready for the next cycle.

Example 34: Direct Extraction of Scandium from a Synthetic Solution Containing about 15,000 ppm Iron Ions with a Composite Extractant-Enhanced Polymer Resin with Phosphoric Acid Functional Groups (Regenerated Ex-Situ with a Single-Pass of Acids, Very Economic), and Followed by In-Situ Stripping and In-Situ Regeneration with One Pass of Hydrochloric Acid A synthetic stream containing about 9 ppm scandium along with 36 ppm nickel, 8 ppm cobalt, 15,210 ppm iron, 1,272 ppm aluminum, 122 ppm chromium, and other divalent cations, such as calcium (>372 ppm), copper (0.8 ppm), magnesium (23,048 ppm), manganese (>1,055 ppm), zinc (23 ppm), silicon (33 ppm), etc. was passed through a PVC column filled with about 4 liters of a composite extractant-enhanced polymer resin (Purolite® S957-DEHPA) that was regenerated in the previous example.

About 100 liters of the synthetic solution was pumped to the top of the column for about 10-12 hours. The raffinate solution was sampled every hour for assays. The collected raffinate solution was then added to additional scandium solution to form more feedstock solution that contained scandium in a concentration between 8 and 11 ppm; and this was repeated 12 times.

Figure 4:
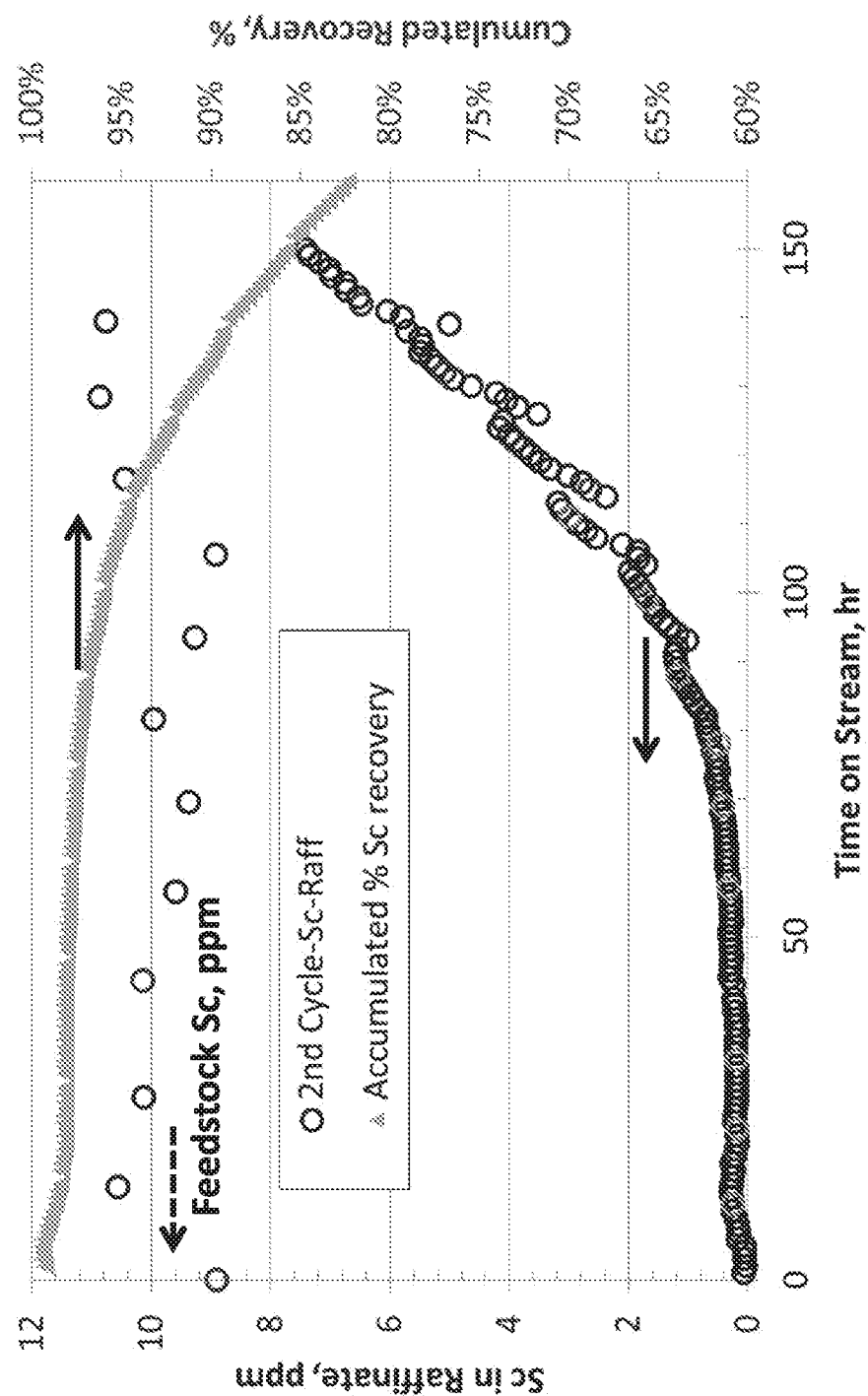
FIG. 4 is a graph showing scandium recovery when using a composite extractant-enhanced polymer resin according to the present invention in a column process for extracting rare earth metals from an acid-leaching solution that contains a large amount of ferric ions (Example 34)

The results for recovering scandium from the synthetic solution are shown in FIG. 4. Scandium ions in the feedstock were partially retained by the extractant-enhanced polymer resin, Purolite® S957-DEHPA; scandium ions in the raffinate increased with the time on stream. The initial scandium recovery was almost 100%; then scandium recovery slowly decreased while the resin continued to be loaded with scandium ions. The resin continued to load scandium even though there were very large amounts of other cations such as iron ions (~1,500:1 for Fe:Sc in mass). After about 150 hour on stream, scandium concentration in the raffinate increased to a level greater than 7 ppm; the cumulated scandium recovery at the end of the run was about 82%.

The loaded resin was then stripped in-situ at 60° C. with a first sodium carbonate solution (which was the second stripping solution from Example 33, about 8.5 liters) by flowing through the column. Such first stripping solution contained 1,277 ppm Sc, 9.4 ppm Al, 88 ppm Ca, <0.3 ppm Co, <0.2 ppm Cr, 1.0 ppm Cu, 63 ppm Fe, 41 ppm Mg, <0.1 ppm Mn, 4.1 ppm Ni, 140 ppm Si, and 10 ppm Zn. Scandium and other impurities in the stripping solution were then precipitated with hydrochloric acid, followed by filtration, to produce a filtered cake.

The resin was then stripped in-situ with a second sodium carbonate solution (fresh solution, 200 gram sodium carbonate per liter, 10 liters) at 60° C. by flowing through the column. The second stripping solution contained 326 ppm Sc, 31 ppm Al, 116 ppm Ca, <0.3 ppm Co, <0.2 ppm Cr, <0.1 ppm Cu, 42 ppm Fe, 57 ppm Mg, <0.1 ppm Mn, <0.7 ppm Ni, 180 ppm Si, and <0.5 ppm Zn; the second stripping solution may be used as a first stripping solution in the next cycle.

The resin was then regenerated in-situ by flowing a hydrochloric acid solution (200 grams per liter, 10 liters) through the column. The used hydrochloric acid solution contained 0.1 ppm Sc, 111 ppm Al, 44 ppm Ca, <0.03 ppm Co, <18.5 ppm Cr, <0.008 ppm Cu, >5,552 ppm Fe, >190 ppm Mg, 38 ppm Mn, 0.7 ppm Ni, 22 ppm Si, and 0.9 ppm Zn. The regenerated resin was ready for the next cycle.

Example 35: Extraction of Scandium from Un-Adjusted Titanium Tailing Waste Liquor Using Composite Extractant-Enhanced Polymer Resin—Batch Method Titanium tailing waste liquor was analyzed with ICP-OES (Inductively-Coupled Plasma-Optical Emission Spectroscopy) for metals content, and the results are shown in Table 8.

TABLE 8

ICP-OES Analysis of Titanium Tailing Waste Liquor Sample

| Element | ppm | Element | ppm | Element | ppm | Element | ppm | Element | ppm |
|---|---|---|---|---|---|---|---|---|---|
| Sc | 71.4 | S | 61.5 | Ni | 58.0 | Mo | 1.26 | Pb | 19.6 |
| Li | 5.31 | K | >388 | Cu | 10.1 | Cd | 0.80 | Bi | <0.03 |
| Be | 1.89 | Ca | >419 | Zn | 22.4 | In | <0.32 | Ce | 173 |
| B | <0.04 | Ti | 4907 | Ga | <0.12 | Sn | 16.1 | Nd | 46.2 |
| Na | >912 | V | 1943 | As | <0.02 | Ba | 148 | Sm | 12.3 |
| Mg | 2694 | Cr | 1080 | Sr | 22.8 | La | 52.5 | Gd | 11.2 |
| Al | 5912 | Mil | 9037 | Y | 26.0 | Hf | 37.8 | Yb | 8.98 |
| Si | 26.4 | Fe | 33333 | Zr | >729 | W | 28.1 | Th | 84.1 |
| P | 62.9 | Co | 16.4 | Nb | 1439 | Hg | <0.09 | U | <0.92 |

About 100 mL of the titanium tailing waste liquor was measured and placed into a 250-mL reagent bottle. About 4 mL of a wet composite extractant-enhanced polymer resin with Purolite® S957 as the polymer resin and di(2-ethylhexyl) phosphoric acid (DEHPA) as the extractant was added to the titanium waste liquor solution. The mixture was agitated using a bottle roller for 24 hours for equilibration. The composite extractant-enhanced polymer resin was separated from the raffinate by filtration using Whatman 42 filter paper and the raffinate was analyzed using ICP-OES for metals content. The results are tabulated in Table 9. The calculated scandium loading (with co-adsorption of other metals such as titanium and zirconium) onto the composite was about 598 mg/L.

TABLE 9

Elemental Analysis of the Feed and Raffinate Solutions after
Extraction by Batch Method (Aqueous to Resin Ratio = 25)

| Element | Feed | Raffinate | Element | Feed | Raffinate | Element | Feed | Raffinate |
|---------|------|-----------|---------|------|-----------|---------|------|-----------|
| Sc | 71.4 | 55.3 | Mn | >336 | >336 | Sn | 27.4 | 24.2 |
| Li | 4.251 | 4.1 | Fe | >1289 | >1297 | Ba | 131 | 125 |
| Be | <0.001 | 0.05 | Co | 16.1 | 14.1 | La | 53.6 | 53.5 |
| B | <0.29 | <0.29 | Ni | 61.5 | 61.3 | Hf | 56.6 | 35.4 |
| Na | >995 | >9922 | Cu | 13.7 | 11.4 | W | 29.6 | 25.5 |
| Mg | >1757 | >1718 | Zn | 22.0 | 21.3 | Hg | <0.02 | <0.02 |
| Al | >5214 | >5149 | Ga | <0.29 | <0.29 | Pb | 17.2 | 16.8 |
| Si | 22.5 | 20.4 | As | <0.04 | 0.05 | Bi | <0.007 | <0.007 |
| P | 122 | 75 | Sr | 20.1 | 19.6 | Ce | 144 | 141 |
| S | 67.7 | 45.418 | Y | 29.3 | 27.9 | Nd | 45.9 | 44.7 |
| K | >361 | >359 | Zr | >796 | >762 | Sm | 13.0 | 12.3 |
| Ca | >447 | >448 | Nb | >1335 | >1130 | Gd | 13.9 | 13.6 |
| Ti | >1190 | >1688 | Mo | 1.7 | 1.418 | Yb | 10.0 | 9.9 |
| V | >1814 | >1720 | Cd | 0.29 | 0.28 | Th | 85.3 | 46.3 |
| Cr | >968 | >926 | In | <0.71 | <0.71 | U | <1.11 | <1.11 |

Figure 5:
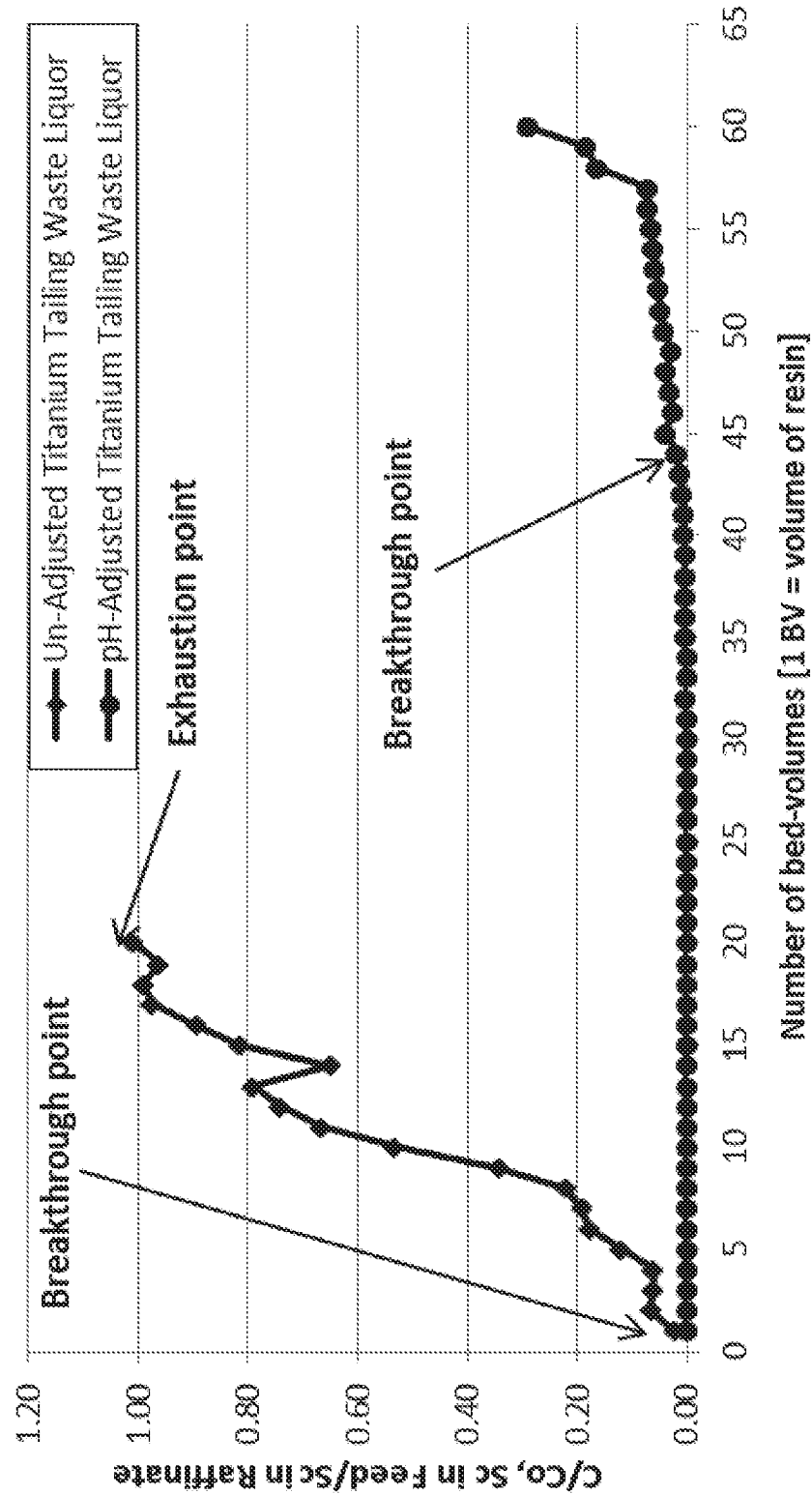
FIG. 5 is a graph showing breakthrough curves comparing the adsorption of scandium onto the composite extractant-enhanced polymer resin from a titanium tailing waste liquor and a pH-adjusted titanium tailing waste liquor (Examples 36 and 37)
Figure 6:
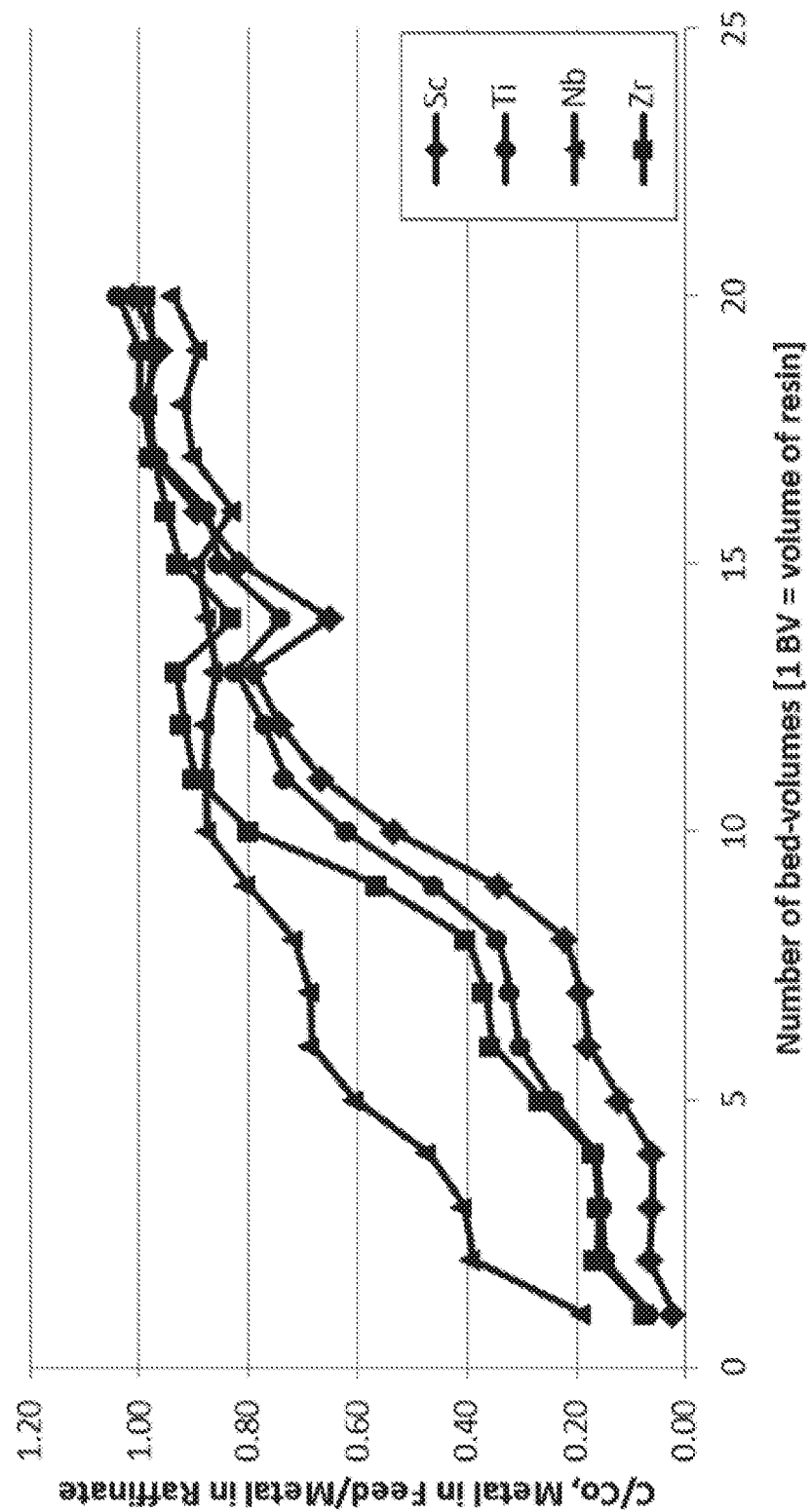
FIG. 6 is a graph showing the co-extraction of early transition metals, such as titanium, niobium, and zirconium, with scandium into a composite extractant-enhanced polymer resin from an un-adjusted titanium tailing waste liquor (Example 36)

Example 36: Extraction of Scandium from Un-Adjusted Titanium Tailing Waste Liquor Using Composite Extractant-Enhanced Polymer Resin—Column Method Thirty-mL portions of the titanium tailing waste liquor from Example 35 were contacted in succession using a peristaltic pump at a rate of 60 mL/hr or 1-bed-volume/hr with 30 mL of the composite extractant-enhanced polymer resin of Example 35 placed in a 50-mL glass burette. The raffinate solutions were allowed to drain by gravity from the bottom of the burette and collected separately in reagent bottles. The raffinate solutions were analyzed with ICP-OES for metals content. The results were tabulated and the ratios ($C/C_o$) of each metal in the titanium tailing waste liquor feed solution ($C_o$) to the metal in the raffinate solutions (C) were calculated and plotted as a breakthrough curve shown in FIG. 5. The breakthrough point for scandium was attained very early after the passage of about the first bed-volume (BV) through the column with a calculated scandium loading on the composite extractant-enhanced polymer resin of about 98 mg/L composite. Consequently, the exhaustion point was achieved at about the nineteenth bed volume with a calculated cumulated scandium loading on the composite extractant-enhanced polymer resin of about 977.2 mg/L composite. The reason for such a behavior was due to the co-adsorption of interfering metal ions such as titanium, niobium, and zirconium with the scandium as shown in FIG. 6.

Example 37: Extraction of Scandium from pH-Adjusted Titanium Tailing Waste Liquor Using Composite Extractant-Enhanced Polymer Resin About 150-mL of the titanium tailing waste liquor of Example 35 was measured and placed in a beaker. While agitating the liquor using a magnetic stirrer, the liquor was slowly adjusted with hydrated lime to a pH of about 0.80 at which time a precipitate started to form in the solution. After maintaining the pH for 30 minutes, a sample of the pH-adjusted liquor was taken and filtered through Whatman 42 filter paper. The pH adjustment was continued to pH values of about 1.5, 2.5, and 3.5 repeating the same steps each time. The liquid filtrates were analyzed with ICP-OES for metals content and the results for scandium, titanium, iron, zirconium, niobium, and other rare earth metals are shown in Table 10. Precipitation was observed to start at around pH 0.80. At about a pH of 0.85, 87.4% of the scandium, 6.7% of the titanium, 8.8% of the zirconium, and 14.9% of the niobium in the titanium tailing waste liquor remained in solution.

TABLE 10

Elemental Analysis of the pH-Adjusted Solutions at Various pH Values

| | Sc | Ti | Zr | Nb | Fe | Y |
|---|---|---|---|---|---|---|
| Head Solution | 71.4 | 4907 | 729 | 1439 | >32826 | 26.0 |
| ~pH 0.85 filtrate | 62.5 | 330 | 64.0 | 215 | >32826 | 21.4 |
| ~pH 1.51 filtrate | 36.3 | 4.21 | 1.45 | 136 | >35023 | 20.4 |
| ~pH 2.60 filtrate | 6.07 | 50.5 | 14.5 | 36.3 | >32088 | 17.7 |
| ~pH 3.50 filtrate | 0.44 | 5.01 | 2.04 | 2.55 | >27658 | 12.6 |

| | Ce | Nd | Sm | Gd | Yb | Th |
|---|---|---|---|---|---|---|
| Head Solution | 173 | 46.2 | 12.3 | 11.2 | 8.98 | 84.1 |
| ~pH 0.85 filtrate | 114 | 45.7 | 0.90 | 9.39 | 7.31 | 7.62 |
| ~pH 1.51 filtrate | 108 | 43.8 | 0.50 | 8.99 | 6.52 | <0.13 |
| ~pH 2.60 filtrate | 91.4 | 36.9 | <0.12 | 8.06 | 3.58 | <0.13 |
| ~pH 3.50 filtrate | 65.8 | 25.7 | <0.12 | 6.09 | 1.87 | <0.13 |

A sufficient volume of the titanium tailing waste liquor to generate at least 1,000 mL of filtrate was transferred into a 4000-mL beaker and, while agitating using an overhead stirrer, hydrated lime was slowly added to adjust the pH to between 0.80 and 0.90. After an hour of equilibration, the pH-adjusted slurry was filtered using a Buchner funnel with the aid of a vacuum pump. The pH-adjusted solution was analyzed with ICP-OES for metals content as shown in Table 11.

TABLE 11

Elemental Composition of pH-Adjusted Solution (pH 0.80-0.90) from Titanium Tailing Waste Liquor

| Element | ppm | Element | ppm | Element | ppm | Element | ppm | Element | ppm |
|---|---|---|---|---|---|---|---|---|---|
| Sc | 62.5 | S | 28.8 | Ni | 62.2 | Mo | 0.55 | Pb | 15.1 |
| Li | 7.87 | K | >517 | Cu | 1.68 | Cd | 0.31 | Bi | 1.55 |
| Be | <0.001 | Ca | >2479 | Zn | 23.9 | In | <0.71 | Ce | 146 |
| B | <0.29 | Ti | 15 | Ga | <0.29 | Sn | <0.02 | Nd | 45.3 |
| Na | >961 | V | >1656 | As | 0.48 | Ba | 131 | Sm | 2.71 |
| Mg | >2116 | Cr | >864 | Sr | 60.5 | La | 59.2 | Gd | 14.9 |
| Al | >6013 | Mn | >317 | Y | 29.8 | Hf | 3.65 | Yb | 10.1 |
| Si | >287 | Fe | >1223 | Zr | 2.98 | W | <0.09 | Th | 20.9 |
| P | <0.06 | Co | 10.1 | Nb | >211 | Hg | <0.02 | U | <1.11 |

Sixty-mL portions of the pH-adjusted solution were contacted in succession using a peristaltic pump at a rate of 60 mL/hr or 1-bed-volume/hr with 30 mL of the composite extractant-enhanced polymer resin of Example 35 placed in a 50-mL glass burette. The raffinate solutions were allowed to drain by gravity from the bottom of the burette and collected separately in reagent bottles. The raffinate solutions were analyzed with ICP-OES for metals content. The results were tabulated and the ratios ($C/C_o$) of each metal in the titanium tailing waste liquor feed solution ($C_o$) to the metal in the raffinate solutions (C) were calculated and plotted as a breakthrough curve shown in FIG. 5. The breakthrough point for scandium was attained at about the forty-fourth bed volume run of the pH-adjusted filtrate with a calculated cumulated scandium loading of about 2,670 mg/L composite which is 27.2 times as much as the scandium loading obtained in Example 36.

Example 38: Use of the Acid Scrubber Solution from a Carbothermal Chlorination Process of Treating Titanium Ores as a Regeneration Solution for the Stripped Composite Extractant-Enhanced Polymer Resin in a Cyclic Operation A sample of acid scrubber solution from carbothermal chlorination processing of titanium ore was analyzed with ICP-OES for metals content and the results are shown in Table 12. The acid scrubber solution was also titrated with standard sodium hydroxide solution to determine the free acid content which was found to be about 157 gpL.

TABLE 12

Elemental Composition of the Acid Scrubber Solution from the Carbothermal Chlorination Process of Treating Titanium Ores

| Element | ppm | Element | ppm | Element | ppm | Element | ppm | Element | ppm |
|---|---|---|---|---|---|---|---|---|---|
| Sc | 62.5 | S | >980 | Ni | <0.04 | Mo | 0.42 | Pb | 1.81 |
| Li | 0.017 | K | 8.62 | Cu | 0.10 | Cd | <0.008 | Bi | <0.007 |
| Be | <0.001 | Ca | 50.2 | Zn | 0.08 | In | <0.71 | Ce | <0.14 |
| B | 1.14 | Ti | 1541 | Ga | 0.47 | Sn | 54.3 | Nd | <0.04 |
| Na | >157 | V | 18.2 | As | 0.92 | Ba | <0.001 | Sm | 0.19 |
| Mg | 8.78 | Cr | <0.01 | Sr | 0.95 | La | <0.008 | Gd | <0.01 |
| Al | <0.26 | Mn | <0.001 | Y | <0.001 | Hf | 0.16 | Yb | <0.003 |
| Si | 99.1 | Fe | 8.96 | Zr | 0.01 | W | <0.09 | Th | 0.15 |
| P | <0.06 | Co | 2.90 | Nb | <0.03 | Hg | <0.02 | U | <1.11 |

Two batches of pH-adjusted solution were prepared from the titanium tailing waste liquor according to Example 37 and analyzed using ICP-OES for metals content. The results are given in Table 13.

TABLE 13

Elemental Composition of pH-Adjusted Solution

| Element | Feed 1 | Feed 2 | Element | Feed 1 | Feed 2 | Element | Feed 1 | Feed 2 |
|---|---|---|---|---|---|---|---|---|
| Sc | 59.5 | 51.5 | Mn | >341 | >607 | Sn | <0.02 | 1.4 |
| Li | 6.14 | 5.48 | Fe | >1283 | >3335 | Ba | 125.6 | 124 |
| Be | <0.001 | <0.001 | Co | 10.1 | 8.52 | La | 64.7 | 56.5 |
| B | <0.29 | <0.29 | Ni | 61.6 | 50.2 | Hf | 5.2 | 6.7 |
| Na | >988 | >1477 | Cu | 2.99 | 4.7 | W | <0.09 | 3.8 |
| Mg | >2042 | >1567 | Zn | 24.6 | 21.7 | Hg | <0.02 | <0.02 |
| Al | >5629 | >4639 | Ga | <0.29 | 2.7 | Pb | 14.9 | 13.3 |
| Si | 17.2 | 92.6 | As | 0.89 | 1.3 | Bi | 2.2 | <0.01 |
| P | <0.06 | 9.68 | Sr | 55.9 | 62.6 | Ce | >158 | >164 |
| S | <0.09 | <0.09 | Y | 29.4 | 27.9 | Nd | 49.3 | 60.5 |
| K | >479 | >407 | Zr | 73.2 | 207.3 | Sm | 3.6 | 4.9 |
| Ca | >2884 | >7691 | Nb | >177 | >245 | Gd | 15.2 | 14.0 |
| Ti | 12.1 | 695 | Mo | 0.86 | 0.88 | Yb | 10.0 | 7.1 |
| V | >1390 | >955 | Cd | 0.54 | 0.84 | Th | 3.1 | 13.1 |
| Cr | >868 | >619 | In | <0.71 | <0.71 | U | <1.1 | <1.1 |

Cyclic loading-stripping-regeneration experiments were conducted using the two feed solutions.

Step 1: About 720 mL of the pH-adjusted solution was measured and added to a 1,000-mL beaker with 30 mL of the composite extractant-enhanced polymer resin of Example 35. With the aid of an overhead stirrer, the resulting mixture was mixed at 100 rpm for 2 hours. The composite extractant-enhanced polymer resin was separated by decantation. The loaded composite extractant-enhanced polymer resin was then mixed with a sufficient amount of deionized water to ensure removal of entrained raffinate and again separated by decantation. The raffinate and the washing were analyzed with ICP-OES for metals content and the scandium and titanium loading on the composite extractant-enhanced polymer resin was calculated. The results are shown in Table 14.

Step 2: The washed, loaded composite extractant-enhanced polymer resin was transferred into a 250-mL beaker for the stripping step. For the first stripping stage, about 75 mL of 200 gpL sodium carbonate solution was added into to the loaded composite extractant-enhanced polymer resin, and the mixture was agitated with the aid of an overhead stirrer for about 30 minutes at about 80° C. The mixture was allowed to cool to room temperature and then the composite extractant-enhanced polymer resin was separated by decantation. For the second stripping stage, about 75 mL of 200 gpL sodium carbonate solution was added to the composite extractant-enhanced polymer resin obtained after the first stripping and the agitation and decantation was repeated. The resulting composite extractant-enhanced polymer resin was mixed with a sufficient amount of deionized water to ensure removal of entrained stripping solution and again separated by decantation. The stripping solutions from the first and second stripping stages and the washing were analyzed with ICP-OES for metals content.

Step 3: The water-washed stripped composite from Step 2 was then mixed with about 75 mL of the acid scrubbing solution as a regeneration solution and mixed with the aid of an overhead stirrer for about 30 minutes. The composite extractant-enhanced polymer resin was separated by decantation, mixed with a sufficient amount of deionized water to ensure removal of entrained regeneration solution, and again separated by decantation. The spent regeneration solution and washing were analyzed with ICP-OES for metals content. The regenerated composite was recovered and weighed for the next cycle.

Steps 1 through 3 were repeated 12 times (Cycles 2 to 13). On Cycle 14, the regeneration solution used was a 200 gpL hydrochloric acid solution prepared from technical grade concentrated hydrochloric acid. On Cycle 15, only Steps 1 and 2 were performed.

The results of the analyses are shown in Table 14. There was about a 6% decrease in scandium loading from about 1915 to 1873 mg Sc/L composite after 8 cycles of using the acid scrubber solution as a regeneration solution because of the uptake of titanium. However, a change in equilibrium appears to have occurred when the second feed solution (containing higher amounts of Ti and other impurities) was used in the test as made evident by the increase in titanium uptake. This change caused another 7% drop in the scandium loading to 1651 mg Sc/L composite.

TABLE 14

Contained Scandium and Titanium in Aqueous Phases and Composite Extractant-Enhance Polymer Resin form Cyclic Loading-Stripping-Regeneration Experiments

| | Loading (Adsorption from Feed ALS onto Composite) | | | | Content in Composite before Stripping | | Stripping (Desorption from Composite) | | Content in Composite Before regeneration | |
|---|---|---|---|---|---|---|---|---|---|---|
| | mg Sc in Raffinate | mg Ti in Raffinate | mg Sc in Composite | mg Ti in Composite | Total mg Sc in Composite | Total mg Ti in Composite | mg Sc in Stripped Solution | mg Ti in Stripped Solution | mg Sc in Composite | mg Ti in Composite |
| Feed 1 | 42.8 | 19.9 | | | | | | | | |
| Cycle 1 | 1.5 | 0.0 | 41.4 | 19.9 | 41.36 | 19.9 | 42.8 | 19.9 | 0.0 | 0.0 |
| Cycle 2 | 1.9 | 6.6 | 37.9 | 13.3 | 37.86 | 133.9 | 37.2 | 38.5 | 0.7 | 95.4 |
| Cycle 3 | 2.2 | 7.1 | 37.9 | 12.9 | 38.57 | 229.3 | 38.6 | 23.3 | 0.0 | 206.0 |
| Cycle 4 | 7.2 | 48.1 | 38.8 | 0.0 | 38.77 | 322.7 | 38.8 | 67.1 | 0.0 | 255.6 |
| Cycle 5 | 5.5 | 46.7 | 40.5 | 0.0 | 40.54 | 368.2 | 40.5 | 82.6 | 0.0 | 285.5 |
| Cycle 6 | 8.4 | 47.0 | 41.6 | 0.0 | 41.64 | 399.1 | 41.6 | 93.2 | 0.0 | 306.0 |
| Cycle 7 | 2.5 | 5.5 | 32.1 | 14.4 | 32.13 | 426.7 | 32.1 | 128.2 | 0.0 | 298.5 |
| Cycle 8 | 3.6 | 11.1 | 35.1 | 8.8 | 35.05 | 420.5 | 35.1 | 141.4 | 0.0 | 279.2 |
| Feed 2 | 37.1 | 500.3 | | | | | | | | |
| Cycle 9 | 6.2 | 246.9 | 30.9 | 253.5 | 30.90 | 647.1 | 30.9 | 217.6 | 0.0 | 429.5 |
| Cycle 10 | 8.6 | 316.6 | 28.4 | 183.7 | 28.45 | 701.6 | 28.4 | 175.1 | 0.0 | 526.5 |
| Cycle 11 | 8.2 | 306.6 | 28.8 | 193.8 | 28.81 | 779.6 | 28.8 | 274.5 | 0.0 | 505.2 |
| Cycle 12 | 11.3 | 330.1 | 25.7 | 170.3 | 25.73 | 730.4 | 25.7 | 267.9 | 0.0 | 462.5 |
| Cycle 13 | 10.3 | 388.3 | 26.8 | 112.1 | 26.76 | 625.9 | 26.8 | 377.7 | 0.0 | 248.1 |
| Cycle 14 | 13.1 | 470.4 | 24.0 | 30.0 | 24.00 | 304.6 | 24.0 | 304.6 | 0.0 | 0.0 |
| Cycle 15 | 9.7 | 453.5 | 27.3 | 46.8 | 27.35 | 46.8 | 27.3 | 46.8 | 0.0 | 0.0 |

| | Regeneration (Adsorption from Acid Scrubber Solution onto Composite) | | Content in Composite before Re-Using | | Volume of resin |
|---|---|---|---|---|---|
| | mg Sc in Composite | mg Ti in Composite | Total mg Sc in Composite | Total mg Ti in Composite | recovered, ml. |
| Feed 1 | | | | | |
| Cycle 1 | 0 | 120.65 | 0.00 | 120.62 | 30 |
| Cycle 2 | 0 | 121.01 | 0.67 | 216.43 | 30 |
| Cycle 3 | 0 | 116.66 | 0.00 | 322.68 | 30 |
| Cycle 4 | 0 | 112.60 | 0.00 | 368.19 | 30 |
| Cycle 5 | 0 | 113.58 | 0.00 | 399.13 | 30 |
| Cycle 6 | 0 | 106.35 | 0.00 | 412.31 | 30 |
| Cycle 7 | 0 | 113.20 | 0.00 | 411.72 | 26 |
| Cycle 8 | 0 | 114.49 | 0.00 | 393.64 | 26 |
| Feed 2 | | | | | |
| Cycle 9 | 0 | 88.41 | 0.00 | 517.88 | 26 |
| Cycle 10 | 0 | 59.37 | 0.00 | 585.87 | 25 |
| Cycle 11 | 0 | 54.92 | 0.00 | 560.10 | 25 |
| Cycle 12 | 0 | 51.35 | 0.00 | 513.81 | 24 |
| Cycle 13 | 0 | 26.52 | 0.00 | 274.65 | 24 |
| Cycle 14 | 0 | 0.00 | 0.00 | 0.00 | 23 |
| Cycle 15 | — | — | — | — | 23 |

Figure 7:
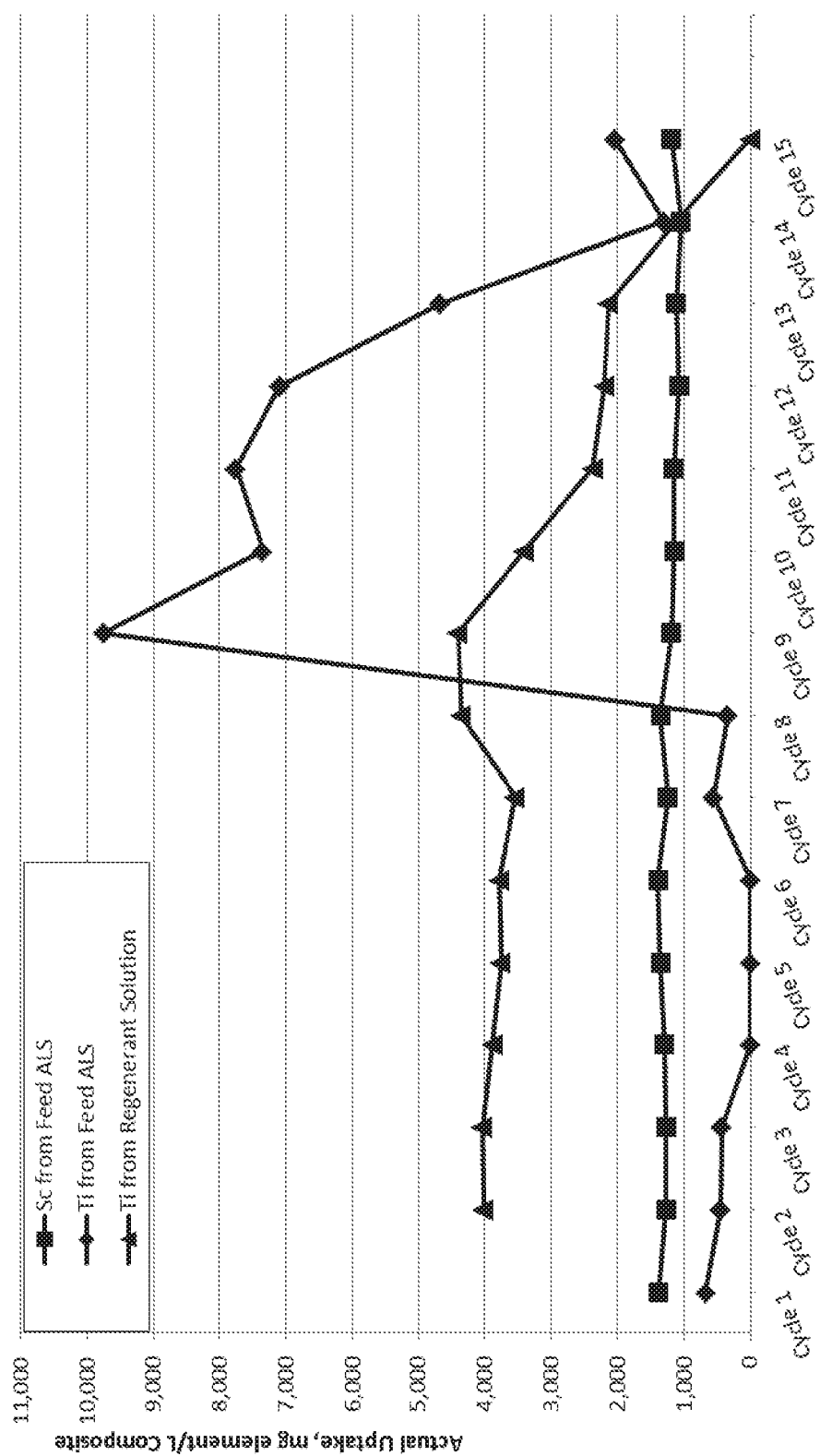
FIG. 7 is a graph showing scandium and titanium uptake onto a composite extractant-enhanced polymer resin in a cyclic operation using an acid scrubber solution from titanium processing as regeneration solution (Example 38).

The scandium and titanium uptakes in mg/L composite (converted from mg/kg composite by using 0.72 g/mL density) were calculated from the results of the analyses and plotted on the graph depicted in FIG. 7.

While specific embodiments of the invention have been described in detail, it will be appreciated by those having ordinary skill in the art that various modifications and alternatives to those details could be developed in light of the overall teachings of the disclosure. The presently preferred embodiments described herein are meant to be illustrative only and not limiting as to the scope of the invention, which is to be given the full breadth of the appended claims and any and all equivalents thereof.

The invention claimed is:

1. A method for extracting rare earth metals from an acidic slurry or acidic solution comprising:

providing an acidic slurry or acidic solution;
adding a composite comprising an extractant and a polymer resin having at least one functional group;
mixing the composite with the provided acidic slurry or acidic solution to form a mixture slurry or solution; and
separating the mixture slurry or solution into a rare-earth-metal-loaded composite and a raffinate slurry or solution,
wherein the provided acidic slurry or acidic solution comprises:
(a) at least one rare earth metal; and
(b) at least one early transition metal selected from the group consisting of titanium (Ti), zirconium (Zr), hafnium (Hf), vanadium (V), niobium (Nb), tantalum (Ta), chromium (Cr), molybdenum (Mo), tungsten (W), manganese (Mn), and rhenium (Re), and/or at least one actinide metal selected from the group consisting of actinium (Ac), thorium (Th), protactinium (Pa), uranium (U), *neptunium* (Np), plutonium (Pu), americium (Am), curium (Cm), berkelium (Bk), californium (Cf), einsteinium (Es), fermium (Fm), mendelevium (Md), nobelium (No), and lawrencium (Lr).

2. The method of claim 1, wherein each of the early transition metals that is present in the provided acidic slurry or acidic solution is present in an amount of up to 50,000 ppm, and each of the actinide metals that is present in the provided acidic slurry or acidic solution is present in an amount of up to 5,000 ppm.

3. The method of claim 1, wherein the provided acidic slurry or acidic solution is an acidic slurry or an acidic solution generated during processing of a material containing at least one rare earth metal and at least one early transition metal and/or one actinide metal.

4. The method of claim 3, wherein the provided acidic slurry or acidic solution is a titanium tailing waste liquor from carbothermal chlorination processing of titanium ores.

5. The method of claim 4, wherein the rare earth metal is scandium.

6. The method of claim 1, further comprising raising the pH of the provided acidic slurry or acidic solution to form a precipitate of at least a portion of the at least one early transition metal and/or at least one actinide metal prior to adding the composite.

7. The method of claim 6, further comprising filtering the precipitate from the acidic slurry or acidic solution prior to adding the composite.

8. The method of claim 6, wherein the precipitate comprises titanium, thorium, or both.

9. The method of claim 1, further comprising stripping the rare earth metals from the rare-earth-metal-loaded composite.

10. The method of claim 5, further comprising regenerating the composite with an acidic solution for reuse.

11. The method of claim 10, wherein the composite is regenerated using a regeneration solution generated during processing of materials containing at least one rare earth metal and at least one early transition metal and/or one actinide metal.

12. The method of claim 11, wherein the regeneration solution is an acid scrubber solution or a spent processing waste solution.

13. The method of claim 12, wherein the regeneration solution is an acid scrubber solution from carbothermal chlorination processing of titanium ores.

14. The method of claim 1, wherein the at least one functional group is a phosphoric acid functional group.

15. The method of claim 1, wherein the extractant comprises a cation extractant.

16. The composite of claim 15, wherein the extractant is di(2ethylhexyl)phosphoric acid (DEHPA).

17. The method of claim 1, wherein the provided acidic slurry or acidic solution comprises:
   a) at least one rare earth metal; and
   b) at least one early transition metal selected from the group consisting of titanium (Ti), zirconium (Zr), hafnium (Hf), vanadium (V), niobium (Nb), tantalum (Ta), chromium (Cr), molybdenum (Mo), tungsten (W), manganese (Mn), and rhenium (Re).

18. The method of claim 1, wherein the provided acidic slurry or acidic solution comprises:
   a) at least one rare earth metal; and
   b) at least one actinide metal selected from the group consisting of actinium (Ac), thorium (Th), protactinium (Pa), uranium (U), *neptunium* (Np), plutonium (Pu), americium (Am), curium (Cm), berkelium (Bk), californium (CO, einsteinium (Es), fermium (Fm), mendelevium (Md), nobelium (No), and lawrencium (Lr).

19. The method of claim 1, wherein the provided acidic slurry or acidic solution comprises:
   a) at least one rare earth metal,
   b) at least one early transition metal selected from the group consisting of titanium (Ti), zirconium (Zr), hafnium (Hf), vanadium (V), niobium (Nb), tantalum (Ta), chromium (Cr), molybdenum (Mo), tungsten (W), manganese (Mn), and rhenium (Re), and
   c) at least one actinide metal selected from the group consisting of actinium (Ac), thorium (Th), protactinium (Pa), uranium (U), *neptunium* (Np), plutonium (Pu), americium (Am), curium (Cm), berkelium (Bk), californium (CO, einsteinium (Es), fermium (Fm), mendelevium (Md), nobelium (No), and lawrencium (Lr).

* * * * *